(12) United States Patent
Lake et al.

(10) Patent No.: US 12,529,112 B2
(45) Date of Patent: Jan. 20, 2026

(54) **BIOMARKERS THAT INDICATE INFECTION WITH *COCCIDIOIDES***

(71) Applicants: Arizona Board of Regents on behalf of Arizona State University, Scottsdale, AZ (US); Mayo Foundation for Medical Education and Research, Rochester, MN (US)

(72) Inventors: Douglas F. Lake, Scottsdale, AZ (US); Thomas E. Grys, Scottsdale, AZ (US); Natalie M. Mitchell, Phoenix, AZ (US)

(73) Assignees: Arizona Board of Regents on behalf of Arizona State University, Scottsdale, AZ (US); Mayo Foundation for Medical Education and Research, Rochester, MN (US)

( * ) Notice: Subject to any disclaimer, the term of this patent is extended or adjusted under 35 U.S.C. 154(b) by 581 days.

(21) Appl. No.: 17/175,265

(22) Filed: Feb. 12, 2021

(65) Prior Publication Data

US 2021/0254183 A1 Aug. 19, 2021

Related U.S. Application Data

(60) Provisional application No. 62/976,925, filed on Feb. 14, 2020.

(51) Int. Cl.
*C12Q 1/6895* (2018.01)
*G01N 33/569* (2006.01)

(52) U.S. Cl.
CPC ..... *C12Q 1/6895* (2013.01); *G01N 33/56961* (2013.01); *C12Q 2600/158* (2013.01); *G01N 2333/37* (2013.01); *G01N 2800/26* (2013.01)

(58) Field of Classification Search
CPC ............ C12Q 1/6895; C12Q 2600/158; G01N 33/56961; G01N 2333/37; G01N 2800/26
See application file for complete search history.

(56) References Cited

U.S. PATENT DOCUMENTS

2018/0106802 A1* 4/2018 Barker ................. A61K 31/713

OTHER PUBLICATIONS

Tarcha, Eric J., et al. "Multivalent recombinant protein vaccine against coccidioidomycosis." Infection and immunity 74.10 (2006): 5802-5813. (Year: 2006).*
An, Steven S., et al. "A novel small molecule target in human airway smooth muscle for potential treatment of obstructive lung diseases: a staged high-throughput biophysical screening." Respiratory research 12.1 (2011): 1-9. (Year: 2011).*
Viriyakosol, Suganya, et al. "Gene expression in human fungal pathogen Coccidioides immitis changes as arthroconidia differentiate into spherules and mature." BMC microbiology 13.1 (2013): 1-15. (Year: 2013).*
Desbois, Sebastien, Ulrik P. John, and Matthew A. Perugini. "Dihydrodipicolinate synthase is absent in fungi." Biochimie 152 (2018): 73-84. (Year: 2018).*

(Continued)

*Primary Examiner* — Louise W Humphrey
*Assistant Examiner* — Candice Lee Swift
(74) *Attorney, Agent, or Firm* — Fish & Richardson P.C.

(57) ABSTRACT

Detecting at least one biomarker indicative of coccidioidomycosis (Valley Fever) in a sample from a subject having or at risk for coccidioidomycosis (Valley Fever).

10 Claims, 11 Drawing Sheets
Specification includes a Sequence Listing.

LCM proteins from human lungs → Top 100 most abundant proteins identified (NSAF) → 73 Human orthologues removed → 27 *Coccidioides* Biomarkers

(56) References Cited

OTHER PUBLICATIONS

NCBI Gene; https://www.ncbi.nlm.nih.gov/gene/?term=CPC735_047390; accessed Jun. 29, 2023 (Year: 2022).*
McKeny PT, Nessel TA, Zito PM. Antifungal Antibiotics. [Updated Mar. 7, 2023]. In: StatPearls [Internet]. Treasure Island (FL): StatPearls Publishing; Jan. 2023—. Available from: https://www.ncbi.nlm.nih.gov/books/NBK538168/ (Year: 2023).*
Whiston, Emily, et al. "Comparative transcriptomics of the saprobic and parasitic growth phases in Coccidioides spp." PloS one 7.7 (2012): e41034. (Year: 2012).*
Lee, P. Y., et al. "Identification of immunogenic proteins of Candida parapsilosis by serological proteome analysis." Journal of applied microbiology 116.4 (2014): 999-1009. (Year: 2014).*
CIMG_05165 ; https://www.ncbi.nlm.nih.gov/gene/?term=CIMG_05165; accessed Feb. 22, 2024 (Year: 2024).*
XP_003071177.1; https://www.ncbi.nlm.nih.gov/protein/XP_003071177.1; accessed Jun. 25, 2024 (Year: 2018).*
XP_003068264.1; https://www.ncbi.nlm.nih.gov/protein/XP_003068264.1; accessed Jun. 25, 2024 (Year: 2018).*
NCBI Gene ID 9694769; https://www.ncbi.nlm.nih.gov/gene/?term=CPC735_024650; accessed Jun. 25, 2024 (Year: 2024).*
Malo, Joshua, et al. "Update on the diagnosis of pulmonary coccidioidomycosis." Annals of the American Thoracic Society 11.2 (2014): 243-253. (Year: 2014).*
NCBI Genome Data Viewer; https://www.ncbi.nlm.nih.gov/gdv/browser/gene/?id=9690984; accessed Jun. 26, 2024 (Year: 2024).*
GenBank: EER24404.1; https://www.ncbi.nlm.nih.gov/protein/240106211; accessed Oct. 26, 2024 (Year: 2009).*
GenBank: EER27129.1; https://www.ncbi.nlm.nih.gov/protein/240108960; accessed Oct. 26, 2024 (Year: 2009).*
GenBank: KMU73920.1; ttps://www.ncbi.nlm.nih.gov/protein/875280187; accessed Oct. 26, 2024 (Year: 2007).*
Sample GenBank Record; ttps://www.ncbi.nlm.nih.gov/genbank/samplerecord/; accessed Oct. 26, 2024; accessed Oct. 26, 2024 (Year: 2024).*
Orsborn, Kris I., et al. "Protein expression profiling of Coccidioides posadasii by two-dimensional differential in-gel electrophoresis and evaluation of a newly recognized peroxisomal matrix protein as a recombinant vaccine candidate." Infection and immunity 74.3 (2006): 1865-1872. (Year: 2006).*
GenBank DQ225176.1; https://www.ncbi.nlm.nih.gov/nuccore/DQ225176.1; accessed May 9, 2025 (Year: 2006).*
GenBank ABB42829.1; https://www.ncbi.nlm.nih.gov/protein/78364922; accessed May 9, 2025 (Year: 2006).*
UniProt; https://www.uniprot.org/uniprotkb/A0A0J6F1U0/entry; accessed May 9, 2025 (Year: 2015).*
Anderson et al., "The human plasma proteome: history, character, and diagnostic prospects," Mol Cell Proteomics, 2002, 1(11):845-67.
Basenko et al., "FungiDB: An Integrated Bioinformatic Resource for Fungi and Oomycetes," J Fungi, 2018, 4(1), 28 pages.
Becker et al., "Pathway analysis of Candida albicans survival and virulence determinants in a murine infection model," Proc Natl Acad Sci USA, 2010, 107(51):22044-9.
Champer et al., "Protein targets for broad spectrum mycosis vaccines: quantitative proteomic analysis of Aspergillus and Coccidioides and comparisons with other fungal pathogens," Ann N Y Acad Sci., 2012, 1273:44-51.

Champer et al., "Proteomic Analysis of Pathogenic Fungi Reveals Highly Expressed Conserved Cell Wall Proteins," J Fungi, 2016, 2:6, 19 pages.

Chuang et al., "Computational prediction of N-linked glycosylation incorporating structural properties and patterns," Bioinformatics, 2012, 28(17):2249-55.

Converse, "Effect of surface active agents on endosporulation of Coccidioides immitis in a chemically defined medium," J Bacteriol., 1957, 74(1):106-7.

Durkin et al., "Detection of Coccidioides antigenemia following dissociation of immune complexes," Clin Vaccine Immunol., 2009, 16(10):1453-6.

Florens et al., "Analyzing chromatin remodeling complexes using shotgun proteomics and normalized spectral abundance factors," Methods, 2006, 40(4):303-11.

Galgiani et al., "Leukocyte effects on the dimorphism of Coccidioides immitis," J Infect Dis., 1982, 146(1):56-63.

Ghosh, "Small heat shock proteins (HSP12, HSP20 and HSP30) play a role in Ustilago maydis pathogenesis," FEMS Microbiol Lett., 2014, 361(1):17-24.

Grys et al., "Total and Lectin-Binding Proteome of Spherulin from Coccidioides posadasii," J Proteome Res., 2016, 15(10):3463-3472.

Hector et al., "Coccidioidomycosis—a fungal disease of the Americas," PLoS Med., 2005, 2(1):e2, 4 pages.

Hung et al., "A parasitic phase-specific adhesin of Coccidioides immitis contributes to the virulence of this respiratory Fungal pathogen," Infect Immun., 2002, 70(7):3443-56.

Jensen et al., "Structural analysis of N- and O-glycans released from glycoproteins," Nat Protoc., 2012, 7(7):1299-310.

Kolde et al., "GOsummaries: an R Package for Visual Functional Annotation of Experimental Data," F1000Res., 2015, 4:574, 23 pages.

Levine et al., "Immunogenicity of spherule-endospore vaccines of Coccidioides immitis for mice," J Immunol., 1961, 87:218-27.

Lewis et al., "Differences in Host Innate Responses among Coccidioides Isolates in a Murine Model of Pulmonary Coccidioidomycosis," Eukaryot Cell., 2015, 14(10):1043-53.

Mead et al., "Characterizing in vitro spherule morphogenesis of multiple strains of both species of *Coccidioides*," Med Mycol., 2018, 57:478-88.

Mitchell et al., "Carbo-loading in *Coccidioides* spp.: a quantitative analysis of CAZyme abundance and resulting glycan populations," Glycobiology, 2019, 30(3):186-196.

Mitchell et al., "Laser Capture Microdissection-Assisted Protein Biomarker Discovery from Coccidioides-Infected Lung Tissue," J Fungi, 2020, 6:365, 13 pages.

Mitchell et al., "Proteogenomic Re-annotation of Coccidioides posadasii strain Silveira," Proteomics, 2018, 18:1700173, 9 pages.

Neafsey et al., "Population genomic sequencing of Coccidioides fungi reveals recent hybridization and transposon control," Genome Research, 2010, 20(7):938-946.

Orsborn et al., "Protein expression profiling of Coccidioides posadasii by two-dimensional differential in-gel electrophoresis and evaluation of a newly recognized peroxisomal matrix protein as a recombinant vaccine candidate," Infect Immun., 2006, 74(3):1865-72.

Parente-Rocha et al., "In vitro, ex vivo and in vivo models: A comparative analysis of *Paracoccidioides* spp. proteomic studies," Fungal Biol., 2018, 122(6):505-513.

Schiess et al., "Targeted proteomic strategy for clinical biomarker discovery," Mol Oncol., 2009, 3(1):33-44.

Schwenk et al., "The Human Plasma Proteome Draft of 2017: Building on the Human Plasma PeptideAtlas from Mass Spectrometry and Complementary Assays," J Proteome Res., 2017, 16(12):4299-4310.

Sharpton et al., "Comparative genomic analyses of the human fungal pathogens Coccidioides and their relatives," Genome Research, 2009, 19(10):1722-1731.

Steentoft et al., "Precision mapping of the human O—GalNAc glycoproteome through SimpleCell technology," EMBO J., 2013, 32(10):1478-88.

Stewart et al., "The stress-responsive chaperone alpha-crystallin 2 is required for pathogenesis of *Mycobacterium tuberculosis*," Mol Microbiol., 2005, 55(4):1127-37.

Supek et al., "REVIGO summarizes and visualizes long lists of gene ontology terms," PLoS One, 2011, 6(7):e21800, 9 bages.

* cited by examiner

BIOMARKERS THAT INDICATE INFECTION WITH *COCCIDIOIDES*

CROSS-REFERENCE TO RELATED APPLICATION

This application claims the benefit of U.S. Provisional Patent Application No. 62/976,925, filed on Feb. 14, 2020, which is incorporated by reference herein in its entirety.

INCORPORATION BY REFERENCE

This application contains a Sequence Listing that has been submitted electronically as an ASCII text file named "22193-0240001_ST25.txt." The ASCII text file, created on Mar. 10, 2025, is 29,914 bytes in size. The material in the ASCII text file is hereby incorporated by reference in its entirety.

TECHNICAL FIELD

This invention relates to biomarkers that indicate infection with *Coccidioides*, a causative agent of Valley Fever.

BACKGROUND

Coccidioidomycosis, also known as Valley Fever, is endemic to the southwestern portion of North America. The causative agent of coccidioidomycosis (Valley Fever) is *Coccidioides*, which are dimorphic ascomycetes of the family Onygenaceae that exist in a mycelial form in the soil (saprobic phase) and a yeast-like spherule form (parasitic phase) in infected mammalian hosts such as dogs, cats, humans and other mammals. Infection occurs through the inhalation of fungal spores from two species of *Coccidioides: Coccidioides immitis* and *Coccidioides* posadasii.

Coccidioidomycosis (Valley Fever) is difficult to diagnose because it mimics viral and bacterial pneumonias such as community acquired pneumonia (CAP). It is also difficult to diagnose because current methods for diagnosis of community acquired pneumonia (CAP) and coccidioidomycosis (Valley Fever) utilize host-produced antibodies that may bind to either tube precipitin (TP) or complement fixation (CF) antigen systems. However, TP and CF detect predominantly mycelial antigens, while the form of *Coccidioides* that grows in mammals is spherules. Therefore, approximately half of symptomatic patients will not test positive initially, however, they will likely test positive weeks to months later. As such, diagnosis of coccidioidomycosis (Valley Fever) can be challenging.

SUMMARY

The present disclosure is based, at least in part, on the finding that elevated levels of certain proteins can be found in samples from patients having coccidioidomycosis (Valley Fever).

Accordingly, aspects of the present disclosure provide, in some embodiments, a method for treating coccidioidomycosis (Valley Fever), the method comprising detecting a level of at least one biomarker in a sample from a subject, and administering a therapy to the subject, wherein the therapy is an antifungal therapy, a surgical therapy, or a combination thereof, and wherein the at least one biomarker is selected from the group consisting of Hsp20/alpha crystallin family protein, Peroxisomal membrane protein, Cofilin, Pyruvate decarboxylase, Uncharacterized protein CPC735_057740, Uncharacterized protein CISG_02340, GTP-binding protein sarA, Uncharacterized protein CIMG_09001, Protein wos2, Eukaryotic porin family protein, Ketol-acid reductoisomerase, mitochondrial, Uncharacterized protein CIMG_05576, Glycine-rich protein, Uncharacterized protein CIMG_00509, Urease accessory protein ureG, ATP synthase subunit 5, Cytochrome c oxidase polypeptide VI, Dihydrodipicolinate synthetase, Uncharacterized protein CISG_09979, ATP synthase delta chain, mitochondrial, ATP synthase subunit d, mitochondrial, Uncharacterized protein CPC735_030710, Protein disulfide-isomerase, Aha1 domain-containing protein, Flavodoxin domain containing protein, NADP-dependent leukotriene B4 12-hydroxydehydrogenase, and Fructose 1,6-bisphosphate aldolase.

In some embodiments, the at least one biomarker is selected from the group consisting of Uncharacterized protein CIMG_09001, Uncharacterized protein CIMG_05576, and Uncharacterized protein CIMG_00509.

In some embodiments, detecting the level of at least one biomarker comprises detecting a level of at least one biomarker protein. In some embodiments, the level of at least one biomarker protein is detected by an immunohistochemical assay, an immunoblotting assay, or a flow cytometry assay.

In some embodiments, detecting the level of at least one biomarker comprises detecting a level of at least one biomarker nucleic acid. In some embodiments, the level of at least one biomarker nucleic acid is detected by a real-time reverse transcriptase PCR (RT-PCR) assay or a nucleic acid microarray assay.

In some embodiments, the sample comprises plasma, urine, serum, tissue, sputum, bronchoalveolar lavage fluid (BALF), or a combination thereof. In some embodiments, the sample is obtained from a subject having or suspected of having coccidioidomycosis (Valley Fever). In some embodiments, the subject is a human patient.

In some embodiments, the therapy is the antifungal therapy is selected from the group consisting of fluconazole, itraconazole, amphotericin B, voriconazole, posaconazole, and isavuconazonium sulfate.

Aspects of the present invention provide, in some embodiments, a method of identifying and treating a subject having coccidioidomycosis (Valley Fever), the method comprising comparing a level of at least one biomarker in a sample from a subject to a reference level, wherein the presence of a level of at least one biomarker in the sample that is above the reference level identifies the subject as having coccidioidomycosis (Valley Fever), and administering a therapy to the subject having coccidioidomycosis (Valley Fever), wherein the therapy is an antifungal therapy, a surgical therapy, or a combination thereof, and wherein the at least one biomarker is selected from the group consisting of Hsp20/alpha crystallin family protein, Peroxisomal membrane protein, Cofilin, Pyruvate decarboxylase, Uncharacterized protein CPC735_057740, Uncharacterized protein CISG_02340, GTP-binding protein sarA, Uncharacterized protein CIMG_09001, Protein wos2, Eukaryotic porin family protein, Ketol-acid reductoisomerase, mitochondrial, Uncharacterized protein CIMG_05576, Glycine-rich protein, Uncharacterized protein CIMG_00509, Urease accessory protein ureG, ATP synthase subunit 5, Cytochrome c oxidase polypeptide VI, Dihydrodipicolinate synthetase, Uncharacterized protein CISG_09979, ATP synthase delta chain, mitochondrial, ATP synthase subunit d, mitochondrial, Uncharacterized protein CPC735_030710, Protein disulfide-isomerase, Aha1 domain-containing protein, Flavodoxin domain containing protein, NADP-dependent leukotriene B4 12-hydroxydehydrogenase, and Fructose 1,6-bisphosphate aldolase.

The details of one or more embodiments of the invention are set forth in the description below. Other features or advantages of the present invention will be apparent from the following drawings and detailed description of several embodiments, and also from the appended claims.

Figure 1:
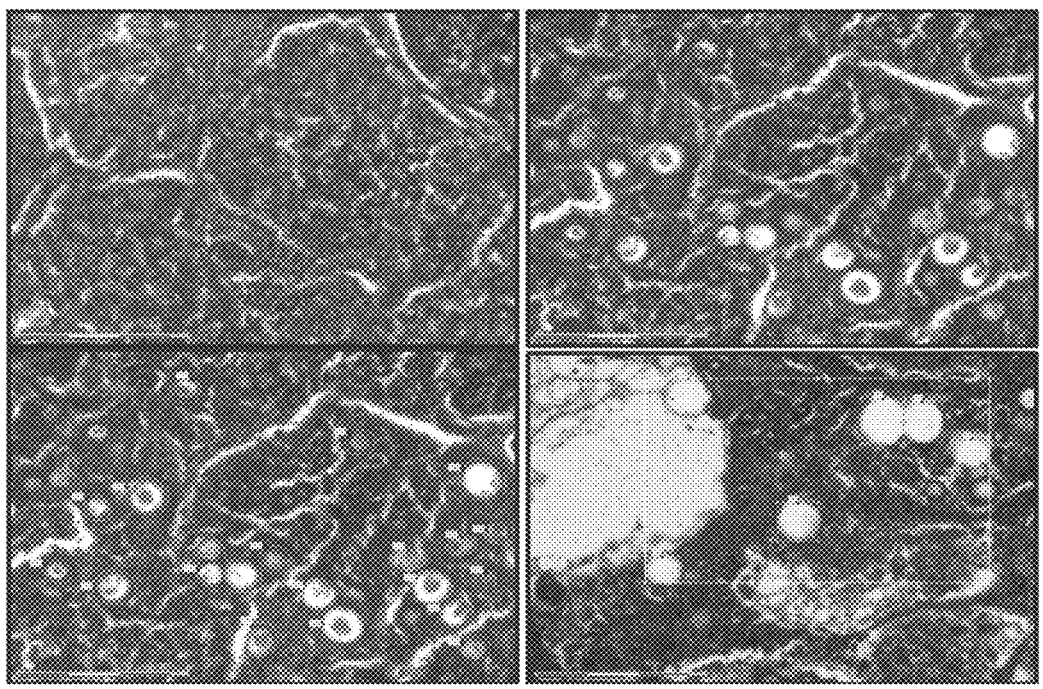
FIG. 1 includes images showing that laser capture microdissection (LCM) of *Coccidioides* spp.-infected human lung tissue is able to precisely extract spherules. Clear (white) circles rimmed with grey boxes indicate areas where spherules were laser-captured. Tissue sections without fungal spherules (top, left) can be ignored, whereas sections with spherule elements (top, right) can be selected (bottom, left) and exclusively removed (bottom, right).

FIG. 2 includes a flowchart for laser capture microdissection (LCM) assisted biomarker discovery. There were a total of 326 *Coccidioides* spp. proteins identified in infected human lung tissues by mass spectrometry. Proteins with the 100 highest normalized spectral abundance factors (NSAFs) were further evaluated for orthology to human proteins (pBLAST>40% identity). Seventy-two human orthologues were removed, leaving 27 *Coccidioides* spp. biomarker candidates.

FIG. 3 includes a scatterplot of gene ontology enrichment of molecular functions, with size of the circles is proportional to the significance of enrichment. FIG. 3 was produced using the Revigo (Supek et al., REVIGO summarizes and visualizes long lists of gene ontology terms. *PLOS ONE* 2011, 6, e21800) and GOSummaries (Kolde & Vilo, GOsummaries: An R Package for Visual Functional Annotation of Experimental Data. *F*1000*Research* 2015, 4, 574) word-cloud plugin from FungiDB (fungidb.org) (Basenko et al., FungiDB: An Integrated Bioinformatic Resource for Fungi and Oomycetes. J. Fungi 2018, 4, 39).

FIGS. 4A-4B include volcano plots of the 27 biomarker candidate proteins that show large fold change of protein abundances (NSAF) between in vivo and in vitro grown proteins. FIG. 4A includes a volcano plot showing fold change of relative protein abundances of LCM lung tissues in relation to the spherule form. FIG. 4B includes a volcano plot showing fold change of relative protein abundances in the spherule form in relation to the mycelial form. Proteins next to arrows had a significant p value, but a fold change could not be calculated because they did not grow in vitro (had NSAF value of 0). Volcano plots were produced in GraphPad Prism v.8, using multiple t tests of NSAF, corrected for multiple comparisons using Holm-Sidak method.

FIGS. 5A-5F include box and whisker plots of differential protein abundances indicating that all biomarker candidate proteins can be produced in vitro, but abundance is dependent on culture media used. In vivo versus in vitro grown spherule abundances are shown for 6 proteins with the highest fold changes (FIGS. 5A-5F). Significance was calculated using one-way ANOVA adjusted for multiple comparisons using Holm-Sidak method (* $p<0.05$, *** $p<0.001$).

DETAILED DESCRIPTION

With over 3500 plasma proteins in the Human Proteome Organization (HUPO) human plasma proteome database and an estimated >500 proteins circulating at any one time in human plasma, identification of low abundance biomarker proteins among high abundance plasma proteins like albumin and immunoglobulins is a difficult challenge in mass spectrometry-based biomarker discovery. To be able to identify low abundance proteins, enrichment using selective antibodies or deletion of highly abundant proteins from serum using other affinity reagents are frequently employed options. However, in order to identify the correct affinity enrichment reagent or to produce a selective antibody, one must identify and produce target biomarkers.

Identification of proteins from pure cultures of an infectious microorganism growing in vitro is feasible. However, the most abundant proteins produced during in vitro culture may not be fully representative of the in vivo proteome of organisms, particularly in the case of a dimorphic fungus such as *Coccidioides*. Protein production is known to be influenced by a number of host pressures not available in vitro (e.g., immune cells, adhesion to host tissues, hypoxia, nutrient gradients/deprivation, osmotic stress, etc.) These factors likely explain the significant differences in phenotype, virulence, and survival that have been noted between fungi grown in vivo versus in vitro. Additionally, even different in vitro culture media formulations can cause significant phenotypic changes in *Coccidioides*.

One biomarker discovery platform which is able to evaluate protein abundance in vivo is laser capture microdissection (LCM) followed by mass spectrometry. LCM facilitates the sampling of selected cellular structures and regions from ex vivo tissues. Described herein are results of an LCM-assisted label-free quantitative proteomic technique for the identification and relative quantification of biomarkers from *Coccidioides* spherules extracted from lung biopsies. In an effort to identify in vitro growth conditions that recapitulate growth conditions in human lungs, protein identifications and abundances from in vivo spherules were compared to the protein abundances produced from in vitro-grown spherules and mycelia in different media and conditions.

In experimental studies described herein, biomarker candidate proteins were identified from *Coccidioides* spp.-infected lung tissue using LCM coupled with mass spectrometry. The 100 most abundant proteins in LCM-captured spherules were identified, and their expression in vitro was measured in three different culture media conditions. Of the one-hundred, 73 human orthologues sharing ≥40% identity to human proteins were removed, leaving 27 possible *Coccidioides* spp. biomarker proteins. All 27 (100%) of the biomarker candidate proteins were expressed in vitro in at least one growth phase-medium combination; however, protein abundance depended on both growth phase and medium type. Additionally, three of the 27 biomarker candidates were found to be *Coccidioides*-specific biomarkers (Uncharacterized proteins CIMG_00509, CIMG_05576, CIMG_09001), as they do not share significant sequence identity to other fungal lung pathogens.

None of the media tested as described herein caused spherule protein expression to closely resemble in vivo growth. However, different in vitro culture media and conditions allowed for different subsets of *Coccidioides* proteins to be produced. Regardless, of the 3 media evaluated as described herein, the maximum number of the 27 biomarker candidates was produced using RPMI+ Survanta (26/27; 96.3%) in spherule cultures.

In vivo grown spherules also produced protein abundances that differed from in vitro grown spherules. Peroxisomal matrix protein, Hsp20/alpha crystallin family protein, Cytochrome c oxidase polypeptide VI, Uncharacterized protein CISG_02340, Uncharacterized protein CIMG_09001, and Uncharacterized protein CIMG_05576 were all significantly more abundant in vivo. While the function of the Uncharacterized proteins is unknown, small heat shock proteins like the Hsp20/alpha crystallin family protein have been implicated in the pathogenesis of the plant fungal pathogen *Ustilago maydis*, as well as the pathogenicity and persistence of the bacterial lung pathogen *Mycobacterium tuberculosis*.

Taken together, the findings described herein demonstrate that Coccidioidal protein expression in vivo is distinct from Coccidioidal protein expression in vitro amongst its two growth phases in each of 3 different culture media. Furthermore, these findings form a foundation upon which to select relevant biomarkers for antigen-based detection of *Coccidioides* in potentially infected patients.

Accordingly, aspects of the present disclosure relate to methods for detecting *Coccidioides* in a sample (e.g., a blood sample) from a subject (e.g., a patient) having or at risk for coccidioidomycosis (Valley Fever).

Such methods can be useful for clinical purposes, e.g., identifying a subject having or at risk for coccidioidomycosis (Valley Fever), selecting a treatment, monitoring disease progression, assessing the efficacy of a treatment against coccidioidomycosis (Valley Fever), or determining a course of treatment for a subject.

The assay methods described herein can also be useful for non-clinical applications, e.g., for research purposes, including, e.g., studying the mechanism of coccidioidomycosis (Valley Fever) infection and/or biological pathways and/or biological processes involved in coccidioidomycosis (Valley Fever), and developing new therapies for coccidioidomycosis (Valley Fever) based on such studies.

I. Detection of Biomarkers Indicative of Coccidioidomycosis (Valley Fever)

Methods described herein are based, at least in part, on the identification of biomarkers that were present in subjects having coccidioidomycosis (Valley Fever).

As used herein, the term "biomarker" or "biomarker set" refers to a biological molecule (e.g., a protein, a nucleic acid) or set of such biological molecules that are present at specific levels. One or more such biomarkers may be present in a specific population of cells (e.g., lung cells in a subject having coccidioidomycosis (Valley Fever)) and the level of each biomarker may deviate from the level of the same biomarker in a different population of cells and/or in a different subject (e.g., a subject who does not have coccidioidomycosis (Valley Fever)). For example, a biomarker that is indicative of coccidioidomycosis (Valley Fever) can have an elevated level in a sample from a subject (e.g., a sample from a subject that has or is at risk for coccidioidomycosis (Valley Fever)) relative to the level of the same marker in a control sample (e.g., a sample from a healthy subject such as a subject who does not have or is not at risk for coccidioidomycosis (Valley Fever)).

Examples of biomarkers indicative of coccidioidomycosis (Valley Fever) are provided in Table 1.

TABLE 1

Biomarkers Indicative of Coccidioidomycosis (Valley Fever).

| Protein Name | Gene Name | SEQ ID NO |
|---|---|---|
| Hsp20/alpha crystallin family protein | CPC735_047390 | |
| Peroxisomal membrane protein | CPC735_024650 | 1 |
| Cofilin | CISG_03898 | 2 |
| Pyruvate decarboxylase | CPSG_03493 | |
| Uncharacterized protein CPC735_057740 | CPC735_057740 | 3 |
| Uncharacterized protein CISG_02340 | CISG_02340 | |
| GTP-binding protein sarA | CPC735_069720 | |
| Uncharacterized protein CIMG_09001 | CPAG_07918 | |
| Protein wos2 | CPC735_022920 | 4 |
| Eukaryotic porin family protein | CPC735_002880 | 5 |
| Ketol-acid reductoisomerase, mitochondrial | CPC735_067570 | |
| Uncharacterized protein CIMG_05576 | CPSG_05795 | |
| Glycine-rich protein | CPC735_026500 | 6 |
| Uncharacterized protein CIMG_00509 | CPC735_057210 | |
| Urease accessory protein ureG | CISG_10193 | |
| ATP synthase subunit 5 | CISG_09525 | 7 |
| Cytochrome c oxidase polypeptide VI | CPSG_00594 | 8 |
| Dihydrodipicolinate synthetase | CPSG_04876 | 9 |
| Uncharacterized protein CISG_09979 | CISG_09979 | |
| ATP synthase delta chain, mitochondrial | CPC735_070430 | 10 |
| ATP synthase subunit d, mitochondrial | CPC735_012590 | 11 |
| Uncharacterized protein CPC735_030710 | CPC735_030710 | |
| Protein disulfide-isomerase | CPC735_035440 | |
| Ahal domain-containing protein | CPSG_01619 | 12 |
| Flavodoxin domain containing protein | CPC735_070770 | 13 |
| NADP-dependent leukotriene B4 12-hydroxy dehydrogenase | CPAG_08737 | 14 |
| Fructose 1,6-bisphosphate aldolase | CPC735_006240 | |

The biomarkers described herein may have a level in a sample obtained from a subject (e.g., patient) having coccidioidomycosis (Valley Fever) that is increased when compared to the level of the same biomarker in a sample obtained from a healthy subject (e.g., a subject who does not have or is not at risk for coccidioidomycosis (Valley Fever)) by at least 20% (e.g., 30%, 50%, 80%, 100%, 2-fold, 5-fold, 10-fold, 20-fold, 50-fold, 100-fold or more). Such biomarker(s) or set of biomarkers may be used in both diagnostic/prognostic applications and non-clinical applications (e.g., for research purposes).

In some embodiments, methods described herein provide determining a level of between 1 to 27 biomarkers indicative of coccidioidomycosis (Valley Fever) from Table 1. For example, in some embodiments, methods described herein provide determining a level of between 5 to 27 biomarkers, between 10 to 27 biomarkers, between 15 to 27 biomarkers, or between 20 to 27 biomarkers. In some embodiments, methods described herein provide determining a level of between 1 to 25 biomarkers, between 1 to 20 biomarkers, between 1 to 15 biomarkers, between 1 to 10 biomarkers, between 1 to 5 biomarkers, or between 1 to 3 biomarkers.

In some embodiments, methods described herein provide determining a level of at least 1 biomarker, at least 2 biomarkers, at least 3 biomarkers, at least 4 biomarkers, at least 5 biomarkers, at least 6 biomarkers, at least 7 biomarkers, at least 8 biomarkers, at least 9 biomarkers, or at least 10 biomarkers indicative of coccidioidomycosis (Valley Fever).

In some embodiments, methods described herein provide determining a level of less than 25 biomarkers, less than 20 biomarkers, less than 15 biomarkers, less than 10 biomarkers, or less than 5 biomarkers.

Methods provided herein can comprise, consist of, or consist essentially of any combination or number of the described biomarkers or a group of biomarkers. In some examples, the group of biomarkers includes at least one control biomarker. A control biomarker can be a positive control or a negative control.

Biomarkers can be grouped based on one or more characteristics of a particular biomarker. In some embodiments, biomarkers are grouped based on an association with a particular pathway (e.g., glycolysis/gluconeogenesis, purine metabolism, pyrimidine metabolism, aminoacyl-tRNA biosynthesis, nitrogen metabolism, fatty acid degradation, pyruvate metabolism, brassinosteroid biosynthesis, steroid biosynthesis, pentose phosphate pathway). In some embodiments, biomarkers are grouped based on a known function of the biomarker (e.g., hydrolase activity, oxidoreductase activity). In some embodiments, biomarkers are grouped based on an unknown or uncharacterized function of the biomarker (e.g., Uncharacterized protein CISG_02340, Uncharacterized protein CIMG_09001 and Uncharacterized protein CIMG_05576). In some embodiments, biomarkers are grouped based on presence of the biomarker in an in vitro culture (e.g., Hsp20/alpha crystallin family protein, Peroxisomal matrix protein, Cytochrome c oxidase polypeptide VI, Uncharacterized protein CISG_02340, Uncharacterized protein CIMG_09001 and Uncharacterized protein CIMG_05576).

Any number and/or combination of the biomarkers listed herein can be used in methods described herein. For example, the group of biomarkers used in methods described herein can comprise, consist of, or essentially consist of 1, 2, 3, 4, 5, 6, 7, 8, 9, 10, 11, 12, 13, 14, 15, 16, 17, 18, 19, 20, 21, 22, 23, 24, 25, 26, or all 27 of the biomarkers listed herein.

II. Utilities of Biomarkers

Any of the biomarkers described herein, either taken alone or in combination (e.g., at least two biomarkers, at least three biomarkers, or more), can be used in the assay methods also described herein for analyzing a sample from a subject that has or is at risk for coccidioidomycosis (Valley Fever). Results obtained from such assay methods can be used in either clinical applications or non-clinical applications, including, but not limited, those described herein.

(a) Sample Analysis

Any sample that may contain *Coccidioides*, a causative agent of Valley Fever, can be analyzed by the assay methods described herein. In some examples, the sample to be analyzed by the assay methods described herein is a biological sample. Accordingly, in some embodiments, methods described herein include providing a sample obtained from a subject. In other examples, the sample may be from an in vitro assay, e.g., from an in vitro fungal culture (e.g., an in vitro fungal culture of *C. posadasii*).

As used herein, a "sample" refers to a composition that comprises biological materials including, but not limited to, plasma, serum, blood, urine, sputum, bronchoalveolar lavage fluid (BALF), tissue, cells, or a combination thereof from a subject. A sample includes both an initial unprocessed sample taken from a subject as well as subsequently processed, e.g., partially purified or preserved forms. In some embodiments, multiple (e.g., at least 2, 3, 4, 5, or more) samples may be collected from a subject, over time or at particular time intervals, for example, to assess the disease progression or evaluate the efficacy of a treatment. In some embodiments, the sample is a fluid sample such as a blood sample or a urine sample.

A sample can be obtained from a subject using any suitable means. In some embodiments, the sample is obtained from the subject by a medical procedure (e.g., bronchoalveolar lavage (BAL)). In some embodiments, the sample is obtained from the subject by a biopsy (e.g., a lung biopsy).

The term "subject" or "patient" can be used interchangeably and refers to a subject who needs the analysis as described herein. In some embodiments, the subject is a human or a non-human mammal (e.g., cat, dog, horse, cow, goat, or sheep). In some embodiments, the subject is suspected of or is at risk for coccidioidomycosis (Valley Fever). Such a subject can exhibit one or more symptoms associated with coccidioidomycosis (Valley Fever) such as fatigue, cough, fever, shortness of breath, headache, night sweats, muscle aches or joint pain, rash on upper body or legs, or a combination thereof.

Alternatively or in addition to, such a subject can have one or more risk factors for coccidioidomycosis (Valley Fever), e.g., exposure to high risk locations (e.g., southwestern United States or parts of Mexico or Central or South America), immunodeficiency, pregnancy, diabetes, or a combination thereof.

Alternatively, the subject who needs the analysis described herein can be a patient having coccidioidomycosis (Valley Fever). Such a subject can currently have coccidioidomycosis (Valley Fever), or can have suffered from coccidioidomycosis (Valley Fever) in the past. In some examples, the subject is a human patient who can be on a treatment of coccidioidomycosis (Valley Fever), e.g., a treatment involving an antifungal medication (e.g., fluconazole). In other instances, such a human patient can be free of such a treatment.

Any sample (e.g., those described herein) can be used in the methods described herein, which involve measuring the level of a biomarker as described herein. Levels (e.g., the amount) of a biomarker disclosed herein, or changes in levels of a biomarker, can be assessed using conventional assays or those described herein.

As used herein, the terms "measuring" or "measurement," or alternatively "detecting" or "detection," means assessing the presence, absence, quantity or amount (which can be an effective amount) of a biomarker within a sample, including the derivation of qualitative or quantitative concentration levels of a biomarker, or otherwise evaluating the values and/or categorization of a biomarker in a sample from a subject.

In some embodiments, the level of a biomarker is assessed or measured by directly detecting biomarker protein in a sample (e.g., a blood sample). Alternatively, or in addition to, the level of biomarker protein can be assessed or measured indirectly in a sample, for example, by detecting the level of activity of biomarker protein.

The level of biomarker protein can be measured using an immunoassay. Examples of immunoassays include any known assay (without limitation), and can include any of the following: competition assay, immunoblotting assay (e.g., Western blot), immunohistochemical analysis, flow cytometry assay, immunofluorescence assay (IF), enzyme-linked immunosorbent assays (ELISAs) (e.g., sandwich ELISAs), radioimmunoassays, electrochemiluminescence-based detection assays, magnetic immunoassays, lateral flow assays, and related techniques. Additional suitable immunoassays for detecting biomarker protein will be apparent to those of skill in the art.

Such immunoassays can involve the use of an agent (e.g., an antibody) specific to a biomarker of interest. An agent such as an antibody that "specifically binds" to a biomarker is a term well understood in the art, and methods to determine such specific binding are also well known in the art. An antibody is said to exhibit "specific binding" if it reacts or associates more frequently, more rapidly, with greater duration and/or with greater affinity with a particular target biomarker than it does with other proteins. It is also understood by reading this definition that, for example, an antibody that specifically binds to a first target peptide may or may not specifically or preferentially bind to a second target peptide. As such, "specific binding" or "preferential binding" does not necessarily require (although it can include) exclusive binding. Generally, but not necessarily, reference to binding means preferential binding. In some examples, an antibody that "specifically binds" to a target peptide or an epitope thereof may not bind to other peptides or other epitopes in the same antigen.

As used herein, the term "antibody" refers to a protein that includes at least one immunoglobulin variable domain or immunoglobulin variable domain sequence. For example, an antibody can include a heavy (H) chain variable region (abbreviated herein as $V_H$), and a light (L) chain variable region (abbreviated herein as $V_L$). In another example, an antibody includes two heavy (H) chain variable regions and two light (L) chain variable regions. The term "antibody" encompasses antigen-binding fragments of antibodies (e.g., single chain antibodies, Fab and sFab fragments, $F(ab')_2$, Fd fragments, Fv fragments, scFv, and domain antibodies (dAb) fragments (de Wildt et al., *Eur J Immunol.* 1996; 26 (3): 629-39)) as well as complete antibodies. An antibody can have the structural features of IgA, IgG, IgE, IgD, IgM (as well as subtypes thereof). Antibodies may be from any source including, but not limited to, primate (human and non-human primate) and primatized (such as humanized) antibodies.

In some embodiments, the antibodies as described herein can be conjugated to a detectable label and the binding of the detection reagent to a biomarker of interest can be determined based on the intensity of the signal released from the detectable label. Alternatively, a secondary antibody specific to the detection reagent can be used. One or more antibodies may be coupled to a detectable label. Any suitable label known in the art can be used in the assay methods described herein. In some embodiments, a detectable label comprises a fluorophore. As used herein, the term "fluorophore" (also referred to as "fluorescent label" or "fluorescent dye") refers to moieties that absorb light energy at a defined excitation wavelength and emit light energy at a different wavelength. In some embodiments, a detection moiety is or comprises an enzyme. In some embodiments, an enzyme is one (e.g., β-galactosidase) that produces a colored product from a colorless substrate.

In some examples, an assay method described herein is applied to measure the level of biomarker in a sample, which can be a blood sample. Any of the assays known in the art (e.g., immunoassays) can be used for measuring the level of biomarker.

It will be apparent to those of skill in the art that this disclosure is not limited to immunoassays. Detection assays that are not based on an antibody, such as mass spectrometry (e.g., matrix assisted laser desorption ionization-time of flight mass spectrometry (MALDI-TOF MS)) are also useful for the detection and/or quantification of biomarker. Assays that rely on a chromogenic substrate can also be useful for the detection and/or quantification of biomarker.

Alternatively, the level of nucleic acids encoding a biomarker of interest in a sample can be measured via a conventional method. In some embodiments, measuring the expression level of nucleic acid encoding a biomarker comprises measuring mRNA. In some embodiments, the expression level of mRNA encoding a biomarker can be measured using real-time reverse transcriptase (RT) Q-PCR or a nucleic acid microarray. Methods to detect biomarker nucleic acid sequences include, but are not limited to, polymerase chain reaction (PCR), reverse transcriptase-PCR (RT-PCR), in situ PCR, quantitative PCR (Q-PCR), real-time quantitative PCR (RT Q-PCR), in situ hybridization, Southern blot, Northern blot, sequence analysis, microarray analysis, detection of a reporter gene, or other DNA/RNA hybridization platforms.

Any binding agent that specifically binds to a biomarker may be used in methods described herein to measure the level of a biomarker in a sample. In some embodiments, the binding agent is an antibody or an aptamer that specifically binds to protein. In other embodiments, the binding agent may be one or more oligonucleotides complementary to a nucleic acid or a portion thereof. In some embodiments, a sample may be contacted, simultaneously or sequentially, with more than one binding agent that binds different biomarkers (e.g., multiplexed analysis).

To measure the level of a target biomarker, a sample can be in contact with a binding agent under suitable conditions. In general, the term "contact" refers to an exposure of the binding agent with the sample or cells collected therefrom for suitable period sufficient for the formation of complexes between the binding agent and target biomarker (e.g., nucleic acid or protein) in the sample, if any. In some embodiments, the contacting is performed by capillary action in which a sample is moved across a surface of the support membrane (e.g., as in a lateral flow assay (LFA)).

In some embodiments, the assays can be performed on low-throughput platforms, including single assay format. For example, a low-throughput platform can be used to measure the presence and amount of biomarker protein in a sample (e.g., a blood sample) for diagnostic methods, monitoring of disease and/or treatment progression, and/or predicting whether a disease or disorder may benefit from a particular treatment.

In some embodiments, it may be necessary to immobilize a binding agent to the support member. Methods for immobilizing a binding agent will depend on factors such as the nature of the binding agent and the material of the support member and may require particular buffers. Such methods will be evident to one of ordinary skill in the art.

The type of detection assay used for the detection and/or quantification of a biomarker such as those provided herein may depend on the particular situation in which the assay is to be used (e.g., clinical or research applications), on the kind of and number of biomarkers to be detected, and/or on the kind and number of patient samples to be run in parallel, to name a few parameters.

The assay methods described herein may be used for both clinical and non-clinical purposes. Some examples are provided herein.

(b) Diagnostic and/or Prognostic Applications

Levels of one or more biomarkers described herein in a sample from a subject can be measured by methods described herein and used for various clinical purposes such as identifying a subject having or at risk for having coccidioidomycosis (Valley Fever) and/or assessing the efficacy of a treatment for coccidioidomycosis (Valley Fever).

In some examples, methods described herein include detecting a level of a biomarker in a sample (e.g., a blood sample) collected from a subject (e.g., a human patient suspected of having coccidioidomycosis (Valley Fever)). The biomarker level is then compared to a reference value to determine whether the subject has or is at risk for coccidioidomycosis (Valley Fever).

The reference value can be a control level of a biomarker. In some embodiments, the control level is a level of a biomarker in a control sample. In some embodiments, a control sample is obtained from a healthy subject or population of healthy subjects. As used herein, a healthy subject is a subject that is apparently free of coccidioidomycosis (Valley Fever) at the time the level of biomarker is measured or has no history of coccidioidomycosis (Valley Fever).

In some embodiments, the amount by which the level (or score) in the subject is greater than the reference level (or score) is sufficient to distinguish a subject from a control subject, and optionally is statistically significantly greater than the level (or score) in a control subject. In cases where the level (or score) of biomarker in a subject being equal to the reference level (or score) of biomarker, the "being equal" refers to being approximately equal (e.g., not statistically different).

Suitable reference values can be determined using methods known in the art, e.g., using standard clinical trial methodology and statistical analysis. The reference values can have any relevant form. In some cases, the reference value comprises a predetermined value for a meaningful score or level of biomarker, e.g., a control reference level that represents a normal level of biomarker, e.g., a level in an unaffected subject or a subject who is not at risk for having coccidioidomycosis (Valley Fever). Alternatively, or in addition to, a control reference level represents a level of biomarker associated with having or at risk having coccidioidomycosis (Valley Fever).

The predetermined level or score can be a single cut-off (threshold) value, such as a median or mean, or a level or score that defines the boundaries of an upper or lower quartile, tertile, or other segment of a clinical trial population that is determined to be statistically different from the other segments. It can be a range of cut-off (or threshold) values, such as a confidence interval. It can be established based upon comparative groups, such as where association with risk of developing disease or presence of disease in one defined group is a fold higher, or lower, (e.g., approximately 2-fold, 4-fold, 8-fold, 16-fold or more) than the risk or presence of disease in another defined group. It can be a range, for example, where a population of subjects (e.g., control subjects) is divided equally (or unequally) into groups, such as a low-risk group, a medium-risk group and a high-risk group, or into quartiles, the lowest quartile being subjects with the lowest risk and the highest quartile being subjects with the highest risk, or into n-quantiles (i.e., n regularly spaced intervals) the lowest of the n-quantiles being subjects with the lowest risk and the highest of the n-quantiles being subjects with the highest risk.

In some embodiments, the predetermined level or score is a level or score determined in the same subject, e.g., at a different time point, e.g., an earlier time point.

The control level can also be a predetermined level. Such a predetermined level can represent the level of biomarker in a population of subjects that do not have or are not at risk for coccidioidomycosis (Valley Fever). The predetermined level can take a variety of forms. For example, it can be a single cut-off value, such as a median or mean. In some embodiments, such a predetermined level can be established based upon comparative groups, such as where one defined group is known to have coccidioidomycosis (Valley Fever) and another defined group is known to not have coccidioidomycosis (Valley Fever). Alternatively, the predetermined level can be a range, for example, a range representing the level of biomarker in a control population within a predetermined percentile.

The control level as described herein can be determined by various methods. In some embodiments, the control level can be obtained by performing a known method. In some embodiments, the control level can be obtained by performing the same assay used for determine the level of biomarker in a sample from a subject. In some embodiments, the control level can be obtained by performing a method described herein. In some embodiments, the control level can be obtained from members of a control population and the results can be analyzed by, e.g., a computational program, to obtain the control level (a predetermined level) that represents the level of biomarker in the control population.

By comparing the level of biomarker in a sample obtained from a subject to the reference value as described herein, it can be determined as to whether the subject has or is at risk for coccidioidomycosis (Valley Fever). For example, if the level of biomarker in a sample from a subject is elevated from the reference value (e.g., increased as compared to the reference value), the candidate subject might be identified as having or at risk for coccidioidomycosis (Valley Fever).

As used herein, "an elevated level or a level above a reference value" means that the level of biomarker is higher than a reference value, such as a predetermined threshold or a level of biomarker in a control sample.

An elevated level of biomarker includes a biomarker level that is, for example, 1%, 5%, 10%, 20%, 30%, 40%, 50%, 60%, 70%, 80%, 90%, 100%, 150%, 200%, 300%, 400%, 500% or more above a reference value. An elevated level of biomarker also includes increasing a phenomenon from a zero state (e.g., no or undetectable biomarker in a sample) to a non-zero state (e.g., some or detectable biomarker in a sample).

As used herein, "a decreased level or a level below a reference value" means that the level of biomarker is lower than a reference value, such as a predetermined threshold or a level of biomarker in a control sample.

An decreased level of biomarker includes a biomarker level that is, for example, 1%, 5%, 10%, 20%, 30%, 40%, 50%, 60%, 70%, 80%, 90%, 100%, 150%, 200%, 300%, 400%, 500% or more below a reference value. A decreased level of biomarker also includes decreasing a phenomenon from a non-zero state (e.g., some or detectable biomarker in a sample) to a zero state (e.g., no or undetectable biomarker in a sample).

(c) Treatment and Efficacy Applications

A subject identified in methods described herein as having or at risk for having coccidioidomycosis (Valley Fever) can be administered any suitable treatment.

In some examples, the level of a biomarker can be used to identify coccidioidomycosis (Valley Fever) that can be treatable using, for example, an antifungal therapy. To practice such a method, the level of a biomarker in a sample collected from a subject having coccidioidomycosis (Valley Fever) can be measured by a suitable method (e.g., those described herein). If the level of the biomarker is elevated from the reference value, it indicates that an antifungal therapy may be effective in treating coccidioidomycosis (Valley Fever).

In some embodiments, the subject is a human patient having a symptom of coccidioidomycosis (Valley Fever). For example, the subject has fatigue, cough, fever, shortness of breath, headache, night sweats, muscle aches or joint pain, rash on upper body or legs, or a combination thereof. In some embodiments, the subject has no symptom of coccidioidomycosis (Valley Fever) at the time the sample is collected, has no history of a symptom of coccidioidomycosis (Valley Fever), or no history of coccidioidomycosis (Valley Fever).

In some embodiments, the subject has coccidioidomycosis (Valley Fever) due to *Coccidioides immitis, Coccidioides posadasii*, or both. In some embodiments, the subject has coccidioidomycosis (Valley Fever) due to *Coccidioides immitis, Coccidioides* posadasii, immunodeficiency, pregnancy, diabetes, or a combination thereof. In some embodiments, the subject is resistant to a treatment such as treatment with a particular antifungal therapy.

Methods described herein can also be applied to evaluate the efficacy of a treatment for coccidioidomycosis (Valley Fever). For example, multiple samples (e.g., blood samples) can be collected from a subject to whom a treatment is performed either before and after the treatment or during the course of the treatment. The level of the biomarker can be measured by any method described herein. If the level of the biomarker decreases after the treatment or over the course of the treatment (the level of the biomarker in a later collected sample as compared to that in an earlier collected sample), remains the same or decrease, it indicates that the treatment is effective.

In the subject is identified as not responsive to the treatment, a higher dose and/or frequency of dosage of the therapy can be administered to the subject identified. In some embodiments, the dosage or frequency of dosage of the therapy is maintained, lowered, or ceased in a subject identified as responsive to the treatment or not in need of further treatment. Alternatively, a different treatment can be applied to the subject who is found as not responsive to the first treatment.

(d) Non-Clinical Applications

Further, levels of any of the biomarkers described herein can be applied to non-clinical uses, e.g., for research purposes. For example, methods described herein can be used to identify novel biological pathways or processes involved in *Coccidioides* infection.

In some embodiments, methods described herein can be applied to the development of a new therapy. For example, the levels of a biomarker(s) can be measured in samples obtained from a subject having been administered a new therapy (e.g., in a clinical trial). In some embodiments, the level of the biomarker can indicate the efficacy of the new therapy or the progress of *Coccidioides* infection in the subject prior to, during, or after the new therapy.

III. Treatment of Coccidioidomycosis (Valley Fever)

A subject having or at risk for coccidioidomycosis (Valley Fever), as identified using the methods described herein, may be treated with any appropriate therapy such as an antifungal therapy, a surgical therapy, or both. Accordingly, methods provided herein include treating a subject based on the output of the described method, e.g., measuring the level of a biomarker or a biomarker set. Accordingly, methods provided herein can comprise administering a therapy to a subject.

In some embodiments, the therapy comprises administering an antifungal therapy to a subject. Non-limiting examples of an antifungal therapy for use in methods described herein include fluconazole, itraconazole, amphotericin B, voriconazole, posaconazole, and isavuconazonium sulfate.

In some embodiments, the therapy comprises a surgical therapy. Non-limiting examples of a surgical therapy for use in methods described herein include debridement, pulmonary resection (e.g., wedge resection, segmentectomy, or lobectomy), evacuation, decortication, thoracostomy, and pneumonectomy.

An effective amount of the therapy can be administered to a subject (e.g., a human) in need of the treatment via any suitable route, such as intravenous administration, e.g., as a bolus or by continuous infusion over a period of time, by intramuscular, intraperitoneal, intracerebrospinal, subcutaneous, intra-articular, intrasynovial, intrathecal, oral inhalation, or topical routes.

"An effective amount" as used herein refers to the amount of each active agent required to confer therapeutic effect on the subject, either alone or in combination with one or more other active agents. Effective amounts vary, as recognized by those skilled in the art, depending on the particular condition being treated, the severity of the condition, the individual patient parameters including age, physical condition, size, weight, the duration of the treatment, the nature of concurrent therapy (if any), the specific route of administration and like factors within the knowledge and expertise of the health practitioner. These factors are well known to those of ordinary skill in the art and can be addressed with no more than routine experimentation. It is generally preferred that a maximum dose of the individual components or combinations thereof be used, that is, the highest safe dose according to sound medical judgment. It will be understood by those of ordinary skill in the art, however, that a patient may insist upon a lower dose or tolerable dose for medical reasons, psychological reasons, or virtually any other reason.

Empirical considerations such as the half-life of an agent will generally contribute to the determination of the dosage. Frequency of administration can be determined and adjusted over the course of therapy, and is generally, but not necessarily, based on treatment and/or suppression and/or amelioration and/or delay of coccidioidomycosis (Valley Fever). Alternatively, sustained continuous release formulations of therapeutic agent may be appropriate. Various formulations and devices for achieving sustained release are known in the art.

As used herein, the term "treating" refers to surgical intervention and/or administration of a composition including one or more active agents to a subject who has coccidioidomycosis (Valley Fever), a symptom of coccidioidomycosis (Valley Fever), and/or a predisposition toward coccidioidomycosis (Valley Fever), with the purpose to cure, heal, alleviate, relieve, alter, remedy, ameliorate, improve, or affect the disorder, the symptom of the coccidioidomycosis (Valley Fever), and/or the predisposition toward coccidioidomycosis (Valley Fever).

Alleviating coccidioidomycosis (Valley Fever) includes delaying the development or progression of the disease, and/or reducing disease severity. Alleviating the disease does not necessarily require curative results.

As used herein, "delaying" the development of a disease (e.g., coccidioidomycosis (Valley Fever)) means to defer, hinder, slow, retard, stabilize, and/or postpone progression of the disease. This delay can be of varying lengths of time, depending on the history of the disease and/or individuals being treated. A method that "delays" or alleviates the development of a disease and/or delays the onset of the disease is a method that reduces probability of developing one or more symptoms of the disease in a given time frame and/or reduces extent of the symptoms in a given time frame, when compared to not using the method. Such comparisons are typically based on clinical studies, using a number of subjects sufficient to give a statistically significant result.

"Development" or "progression" of a disease means initial manifestations and/or ensuing progression of the disease. Development of the disease can be detectable and assessed using standard clinical techniques known in the art. However, development also refers to progression that may be undetectable. For purposes of this disclosure, development or progression refers to the biological course of the symptoms. "Development" includes occurrence, recurrence, and onset. As used herein, "onset" or "occurrence of coccidioidomycosis (Valley Fever) includes initial onset and/or recurrence.

In some embodiments, the therapy is administered one or more times to the subject. In some embodiments, the therapy comprises two or more types of therapies that can be administered as part of a combination therapy for treatment of coccidioidomycosis (Valley Fever) (e.g., a combination therapy comprising a first antifungal agent and a second antifungal agent).

The term combination therapy, as used herein, embraces administration of these agents in a sequential manner, that is wherein each therapeutic agent is administered at a different time, as well as administration of these therapeutic agents, or at least two of the agents, in a substantially simultaneous manner.

Sequential or substantially simultaneous administration of each agent can be affected by any appropriate route including, but not limited to, oral routes, intravenous routes, intramuscular routes, subcutaneous routes, and direct absorption through mucous membrane tissues. The agents can be administered by the same route or by different routes. For example, a first agent can be administered orally, and a second agent can be administered intravenously.

As used herein, the term "sequential" means, unless otherwise specified, characterized by a regular sequence or order, e.g., if a dosage regimen includes the administration of a first therapeutic agent and a second therapeutic agent, a sequential dosage regimen could include administration of the first therapeutic agent, before, simultaneously, substantially simultaneously, or after administration of the second therapeutic agent, but both agents will be administered in a regular sequence or order. The term "separate" means, unless otherwise specified, to keep apart one from the other. The term "simultaneously" means, unless otherwise specified, happening or done at the same time, i.e., the agents of the invention are administered at the same time. The term "substantially simultaneously" means that the agents are administered within minutes of each other (e.g., within 10 minutes of each other) and intends to embrace joint administration as well as consecutive administration, but if the administration is consecutive it is separated in time for only a short period (e.g., the time it would take a medical practitioner to administer two agents separately). As used herein, concurrent administration and substantially simultaneous administration are used interchangeably. Sequential administration refers to temporally separated administration of the agents described herein.

Without further elaboration, it is believed that one skilled in the art can, based on the above description, utilize the present invention to its fullest extent. The following specific embodiments are, therefore, to be construed as merely illustrative, and not limitative of the remainder of the disclosure in any way whatsoever. All publications cited herein are incorporated by reference for the purposes or subject matter referenced herein.

EXAMPLES

In order that the invention described may be more fully understood, the following examples are set forth. The examples described in this application are offered to illustrate the methods and compositions provided herein and are not to be construed in any way as limiting their scope.
Materials and Methods The following materials and methods were used in the Examples set forth herein.

*Coccidioides* spp.-Infected Tissue Samples

Triplicate technical replicates of archived formalin-fixed paraffin embedded (FFPE) lung tissue blocks from each of 3 naturally-infected human clinical cases were used in studies described herein. Infections had been culture-confirmed cases of *Coccidioides* spp., and all three patients were immunosuppressed (2 HIV positive individuals and 1 treated with adalimumab). Tissue blocks were acquired from Mayo Clinic Arizona histology biobank in accordance with IRB #12-000965 (human tissue). Ten micrometer thick sections were cut using a microtome and transferred to 1 mm polyethylene naphthalate (PEN) membrane slides (Carl Zeiss Microscopy; Jena, Germany), deparaffinized and stained with hematoxylin and eosin stain (H&E) using standard procedures.

LCM of FFPE Tissues

Laser capture microdissection (LCM) was performed using a Zeiss PALM MicroBeam scope with RoboPalm software (Carl Zeiss Microscopy). Approximately 500,000 $\mu m^2$ area of spherules in lung tissue was collected for each sample by laser capture. Tissue features (spherules) were selected, collected and catapulted into the cap of 0.5 ml Eppendorf tubes containing 35 µl of 0.1 M Tris-HCl (pH=8.0), 0.002% Zwittergent Z3-16 (MilliporeSigma) via laser pressure catapulting (FIG. 1). Immediately after capture, the tube was centrifuged at 14000×g for 2 min to collect the lysis solution and tissue into the bottom of the tube and was frozen at −80° C. until processing.

In-Solution Protein Digestion

Formalin-protein crosslinks were broken from the tissue fragments by heating the sample at 99° C. for 1 h. Proteins were reduced by the addition of 1.8 µl of 200 mM tris(2-carboxyethyl) phosphine (TCEP, MilliporeSigma) in 0.1 mM Tris, pH 8.2, (final conc. TCEP=10 mM) and incubated at 56° C. for 30 min. Afterwards, proteins were alkylated by the addition of 1.9 µl of 200 mM iodoacetamide (IAA, MilliporeSigma) in 0.1 M Tris-HCl (final conc.=10 mM), and incubated in the dark at RT for 30 min. Finally, proteins were digested by adding 2 µl of 0.01 µg/µl trypsin (Thermo) and incubating at 37° C. for 16 h. The digestion was terminated by adding 4 µl of 2% formic acid (FA) prior to loading on the mass spectrometer. Loading was normalized to the area of tissue, optimally 500,000 square microns per sample provides ~500 ng protein.

Fungal Culture Preparation and Protein Lysis

The mycelial form of *Coccidioides* posadasii strain Silveira (strain kindly provided by Dr. Bridget Barker of the University of Arizona) was grown in a shake flask rotating at 180 RPM in 30° C. for 7 days in one of the following six liquid medias: 1) Levine modification of Converse media (Levine et al., Immunogenicity of spherule-endospore vaccines of *Coccidioides immitis* for mice. *J. Immunol.* 87, 218-227 (1961)) with 0.5% N-Tamol (Dow Chemical Company, Midland MI), 2) RPMI-1640 medium (Corning) with 10% fetal bovine serum (FBS) or 3) RPMI-1640 medium with 0.1% Survanta (Beractant bovine lung surfactants; Abbot Laboratories, Chicago IL).

Spherule form of *C. posadasii* strain Silveira cultures were grown in vented shake flasks rotating at 180 RPM in 20% $CO_2$ at 40° C. for 7 days in the same three media as above. Cultures were centrifuged at 4,500 RPM for 30 minutes in a Thermo Forma Multi RF tabletop centrifuge (Thermo). Supernatants were then sterilized by filtration through 0.45 µm vacuum filtration units (MilliporeSigma). Culture pellets were resuspended 5:1 in fungal lysis buffer (50 mM Tris, pH 7.6, 100 mM NaCl, 50 mM EDTA, 5% SDS) prior to transfer into 1.5 ml silicone washer-sealed internally-threaded cryovials containing ~350 μl of 0.5 mm acid-washed sterile glass beads. Spherule culture pellets in cryovials were subjected to two rounds of bead beating at maximum speed for 15 minutes followed by 3 cycles of flash freezing on dry ice. Sterility/viability was checked by plating 10% of the total volumes onto 2× glucose yeast extract agar (2×GYE) for 3 weeks at RT.

Fungal Culture Protein Extraction and in-Gel Protein Digestion

Fungal culture proteins from filtered supernatants and pellet lysates were extracted using a modification of a previously published protocol (Jensen et al., Structural analysis of N- and O-glycans released from glycoproteins. Nat. Protoc. 7, 1299-1310 (2012)). In brief, filtrates and lysates were centrifuged for 30 minutes at 8,000 RPM at 4° C. The supernatants were put into fresh tubes and proteins were precipitated by the addition of 4 volumes of ice cold 10% w/v trichloroacetic acid (TCA, MilliporeSigma) in acetone with 0.007% w/v dithiothreitol (DTT, G Biosciences, St. Louis, MO). Samples were centrifuged at 3,000 g for 10 minutes and the resultant protein pellets were washed three times in ice cold acetone with 0.007% DTT. The final pellet was then resuspended in rehydration buffer [7M urea, 2M Thiourea, 4% w/v 3-[(3-Cholamidopropyl)dimethylammonio]-1-propanesulfonate hydrate (CHAPS, all MilliporeSigma) and 20 mM DTT].

Samples in rehydration buffer were then filter exchanged with phosphate buffered saline (PBS), using Amicon® Ultra 0.5 ml 3 kDa filtration units (MilliporeSigma) prior to protein estimation using a micro bicinchoninic acid (BCA) protein assay kit (Thermo). ~10 μg of protein from filtrate samples and ~30 μg of corresponding lysate protein were mixed with reducing Laemmli sample buffer (BioRad, Hercules, CA), heated at 95° C. for 5 minutes prior to loading on mini-Protean™ TGX precast gels (BioRad). Following electrophoresis, gels were stained with Bio-Safe Coomassie G-250 Stain (BioRad) as per manufacturer's instructions. Each sample lane of the SDS-PAGE gel was cut into six equal size slices. Band slices were then further reduced into cubes of 1-2 mm$^3$, put into low protein binding tubes (Eppendorf, Hamburg, Germany) prior to destaining. Proteins were reduced in 10 mM DTT for 30 minutes at 60° C., and alkylated with 55 mM iodoacetamide (IAA, MilliporeSigma) for 30 minutes at room temperature in the dark, prior to 37° C. overnight digestion with Pierce™ MS Grade trypsin protease (Thermo) diluted to 20 ng/ml in 100 mM ammonium bicarbonate (MilliporeSigma). The peptides were then extracted from the gel pieces using 5% FA, ammonium bicarbonate and acetonitrile washes prior to being dried in a speed vacuum and stored at −80° C. until LC-MS analysis.

Proteomic Analysis of Fungal Lysates and Filtrates

Protein digests were reconstituted in 0.1% FA and analyzed using LC-MS/MS by loading onto a Dionex UltiMate® 3000 RSLC liquid chromatography (LC) system (Thermo, San Jose, CA) using a PepMap RSLC C18 2 μm, 75 μm×50 cm EASY-Spray™ column (Thermo). Peptides were separated using a 0.3 μL/min LC gradient comprised of 2%-90% mobile phase B in 0-120 minutes. Mobile phase A and B were 0.1% FA in water and acetonitrile, respectively. Eluting peptides were directly injected into an Orbitrap Elite Velos mass spectrometer (Thermo) and ionized using collision-induced dissociation (CID) in positive ion mode. A "top 15" data-dependent MS/MS analysis was performed (acquisition of a full scan spectrum followed by collision-induced dissociation mass spectra of the 15 most abundant ions in the survey scan).

Protein Identification and Label-Free Protein Quantification

Database searching was performed using Sequest (Thermo) in Proteome Discoverer v1.4.1.14 (Thermo) against a combined FASTA database of all the most recent Uniprot *Coccidioides* spp. proteomes (*Coccidioides immitis* RS, proteome ID: UP000001261, Jun. 12, 2018 release date; *Coccidioides immitis* RMSCC 3703, proteome ID: UP000054559, Feb. 26, 2018 release date; *Coccidioides immitis* H538.4, proteome ID: UP000054563, Feb. 26, 2018 release date; *Coccidioides immitis* RMSCC 2394, UP000054565, Feb. 26, 2018 release date; *Coccidioides posadasii* strain RMSCC 757/Silveira, proteome ID: UP000002497, Feb. 26, 2018 release date, *Coccidioides posadasii* C735, proteome ID: UP000009084, Nov. 9, 2018 release date; and *Coccidioides posadasii* RMSCC 3488, UP000054567, Oct. 26, 2018 release date). Searches were performed using a fragment tolerance of 0.60 Da (Monoisotopic), parent tolerance of 10 ppm (Monoisotopic), with carbamidomethyl of cysteine as fixed and oxidation of methionine as variable modifications with maximum missed cleavages allowed of 2. Protein identifications were accepted if they achieved a minimum of 2 peptides per protein and a false discovery rate (FDR) of <1%. Label-free protein quantification was performed using normalization of spectral abundance factors (NSAF) in Scaffold (v4.8.7, Proteome Software Inc.).

Biomarker Identification and Bioinformatics

The top 100 most abundant *Coccidioides* spp. proteins found in LCM lung tissues from the mean of triplicate technical replicates were identified. These "top 100" most abundant Coccidioidal proteins were subjected to a pBLAST search (blast.ncbi.nlm.nih.gov) against the *Homo sapiens* proteome (taxid: 9606), to exclude human orthologues. An independent analysis was performed to detect *Coccidioides* spp. peptides found in the LCM lung tissues and assess their homology against any peptides found in human and non-*Coccidioides* spp. fungi proteins present in NCBI non-redundant (NR) database. Detected peptides were filtered to retain *Coccidioides* spp. peptides that do not share 100% homology with either human or non-*Coccidioides* spp. fungi proteins. These peptides could be utilized to develop targeted mass spectrometry-based assays for detecting the presence of *Coccidioides* spp. in human biological samples.

Gene ontology identifiers of each remaining protein were pulled from Uniprot (uniprot.org). A gene ontology enrichment scatterplot was produced using the Revigo (Supek et al., REVIGO summarizes and visualizes long lists of gene ontology terms. *PLOS ONE* 6, e21800. (2011)) plugin in FungiDB (fungidb.org) (Basenko et al., FungiDB: An Integrated Bioinformatic Resource for Fungi and Oomycetes. *J. Fungi* 4, 39 (2018)). The wordcloud of enriched KEGG metabololic pathways was produced using the GOSummaries (Kolde and Vilo, GOsummaries: An R Package for Visual Functional Annotation of Experimental Data. *F1000Research* 4, 574 (2015)) plugin, also from FungiDB. Protein O-glycosylation predictions were made using NetOGlyc server 4.0 (Steentoft et al., Precision mapping of the human O-GalNAc glycoproteome through SimpleCell technology. *EMBO J.* 32, 1478-1488 (2013)). N-glycosylation and signal peptide predictions were determined using NetNGlyc 1.0 server (Chuang et al., Computational prediction of N-linked glycosylation incorporating structural properties and patterns. *Bioinformatics* 28, 2249-2255 (2012)).

Statistical Analyses

GraphPad Prism v.8.0 was used for production and statistical analyses, including those used in creating volcano plots and box and whisker plots. Volcano plots were created using multiple t tests of Normalized Spectral Abundance Factor (NSAF), corrected for multiple comparisons using Holm-Sidak method. NSAF is a unitless, arbitrary value used to rank abundance of proteins across samples and experiments (Florens et al., Analyzing chromatin remodeling complexes using shotgun proteomics and normalized spectral abundance factors. *Methods* 40, 303-311 (2006)). Analysis of in vivo versus in vitro grown spherule abundances was calculated using a one-way ANOVA followed by Tukey test and adjusted for multiple comparisons using Sidak's method.

Example 1: Proteomic Analysis and Biomarker Selection

Figure 2:
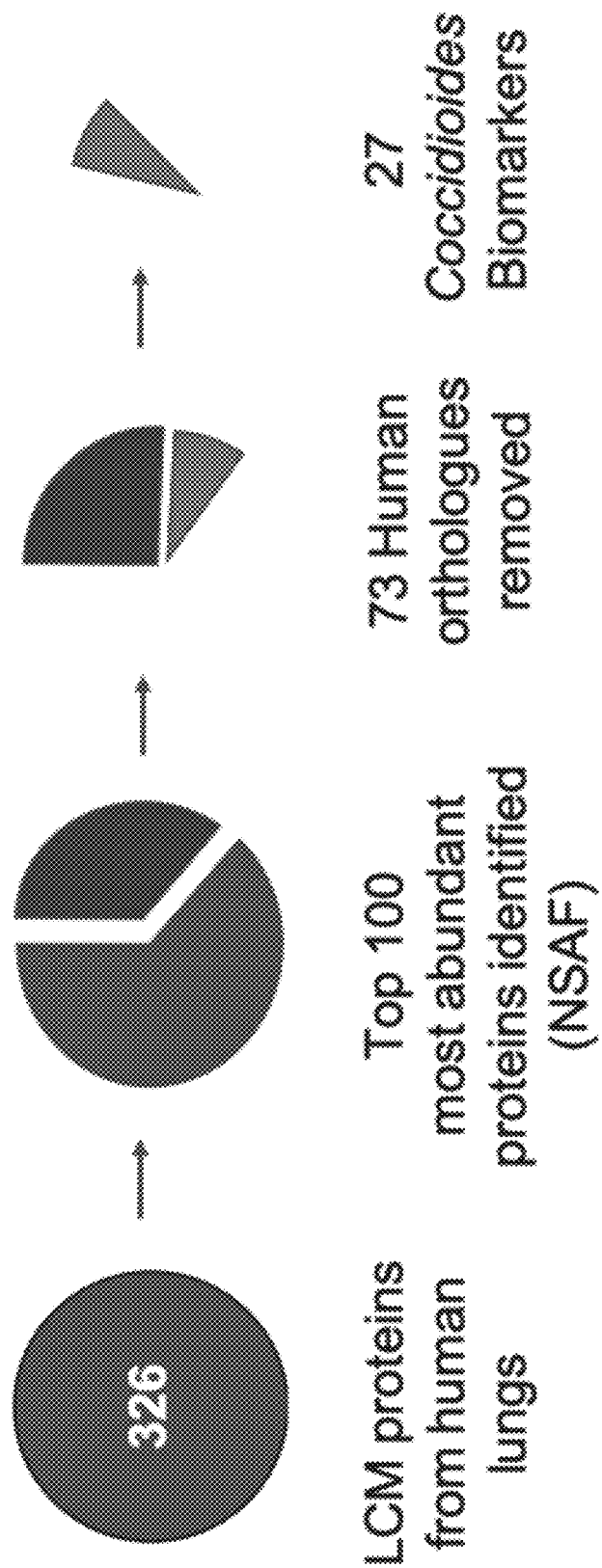
Figure 3:
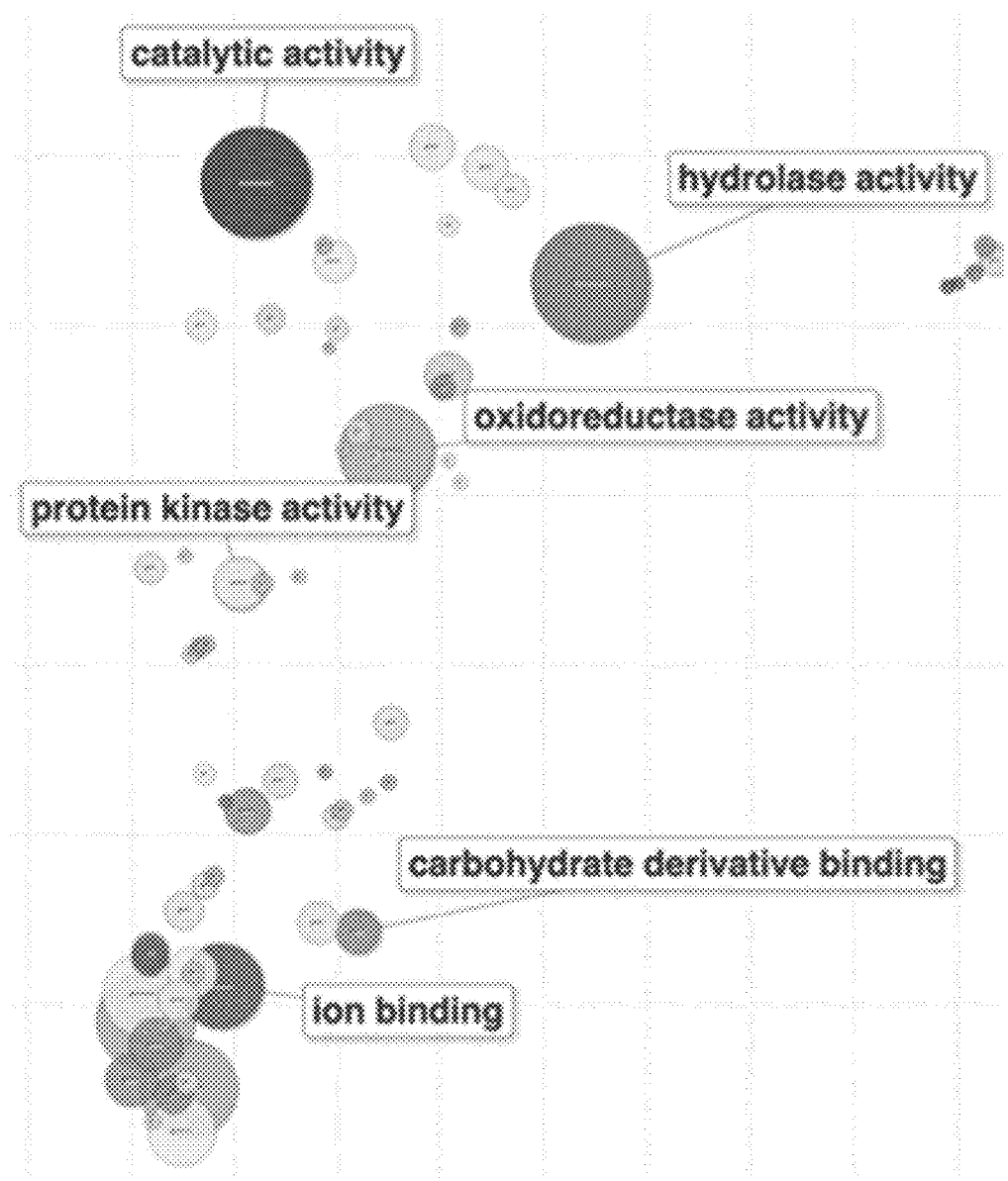

Using a 1% FDR cut-off there were a total of 326 *Coccidioides* spp. proteins identified by mass spectrometry from the lung tissue samples used in this study (FIG. 2). After *Coccidioides* spp. protein identities, they were then analyzed for possible biomarkers. The mean normalized spectral abundance factors (NSAF) of triplicate technical replicates were calculated and the top 100 most abundant proteins were identified.

In order to identify the best proteins for use in an antigen-based detection method, seventy-three *Coccidioides* spp. proteins with human orthologues (pBLAST≥40% identity) were removed from the dataset, leaving 27 possible *Coccidioides* spp. biomarkers. A pBLAST search of these 27 possible biomarker proteins against all fungi (taxid: 4751) revealed between 53% and 93% shared identity with other pneumonia-causing fungal species for 24/27 of the biomarker candidates. Only 3 proteins did not share significant identity with other pneumonia-causing fungal species; of which all 3 of these proteins were uncharacterized proteins (CIMG_00509, CIMG_05576, CIMG_09001), and shared sequence identity in *C. immitis* and *C. posadasii* strains.

Gene ontology enrichment analysis of the 27 biomarker candidates indicate significant increases in certain molecular functions and metabolic pathways. As seen in FIG. 3, catalytic, hydrolase and oxidoreductase activities are most increased, with moderate increase in carbohydrate derivative binding. Enrichment of KEGG metabolic pathways indicated increased purine/pyrimidine metabolism, as well as glycolysis/gluconeogenesis.

The 27 biomarker candidate proteins were then identified from in vitro mycelial and spherule forms of fungal cultures, each in three different media preparations. Information regarding protein molecular weight, protein glycosylation and secretion signal predictions for each biomarker is shown in Table 2. The mean NSAF of triplicate technical replicates for all biological replicates (n) were calculated (data not shown). Of the 27 biomarker candidates, 13 (48.1%) were predicted to contain N-glycosylation sites, 18 (66.7%) were predicted to contain O-glycosylation sites, and 7 (25.9%) were predicted to contain signal peptides. All 27 biomarker candidates are less than 65 kDa in size, with 23 (85.2%) at being <45 kDa in size, of which 10 (37.0%) are ≤20 kDa in size.

Taken together, these results provide identification of 27 *Coccidioides* spp. biomarker candidates.

TABLE 2

Biomarker Characteristics.

| | Protein Name | Signal Peptide (Y/N) | N-glycan site? | O-glycan site? | Gene names | Molecular Weight |
|---|---|---|---|---|---|---|
| 1 | Hsp20/alpha crystallin family protein | N | N | Y | CPC735_047390 | 24 kDa |
| 2 | Peroxisomal membrane protein | N | N | N | CPC735_024650 | 18 kDa |
| 3 | Cofilin | N | N | N | CISG_03898 | 17 kDa |
| 4 | Pyruvate decarboxylase | N | Y | Y | CPSG_03493 | 63 kDa |
| 5 | Uncharacterized protein CPC735_057740 | N | Y | N | CPC735_057740 | 16 kDa |
| 6 | Uncharacterized protein CISG_02340 | N | N | Y | CISG_02340 | 12 kDa |
| 7 | GTP-binding protein sarA | Y | Y | Y | CPC735_069720 | 21 kDa |
| 8 | Uncharacterized protein CIMG_09001 | Y | N | N | CPAG_07918 | 13 kDa |
| 9 | Protein wos2 | N | N | Y | CPC735_022920 | 21 kDa |
| 10 | Eukaryotic porin family protein | Y | N | Y | CPC735_002880 | 30 kDa |
| 11 | Ketol-acid reductoisomerase, mitochondrial | N | Y | Y | CPC735_067570 | 45 kDa |
| 12 | Uncharacterized protein CIMG_05576 | Y | N | Y | CPSG_05795 | 57 kDa |
| 13 | Glycine-rich protein | N | Y | Y | CPC735_026500 | 36 kDa |
| 14 | Uncharacterized protein CIMG_00509 | Y | N | Y | CPC735_057210 | 11 kDa |
| 15 | Urease accessory protein ureG | N | Y | Y | CISG_10193 | 28 kDa |
| 16 | ATP synthase subunit 5 | Y | N | Y | CISG_09525 | 30 kDa |
| 17 | Cytochrome c oxidase polypeptide VI | N | Y | Y | CPSG_00594 | 18 kDa |
| 18 | Dihydrodipicolinate synthetase | N | N | N | CPSG_04876 | 33 kDa |
| 19 | Uncharacterized protein CISG_09979 | N | Y | N | CISG_09979 | 13 kDa |
| 20 | ATP synthase delta chain, mitochondrial | N | Y | Y | CPC735_070430 | 18 kDa |
| 21 | ATP synthase subunit d, mitochondrial | N | N | Y | CPC735_012590 | 20 kDa |
| 22 | Uncharacterized protein CPC735_030710 | N | Y | Y | CPC735_030710 | 21 kDa |

TABLE 2-continued Biomarker Characteristics.

| | Protein Name | Signal Peptide (Y/N) | N-glycan site? | O-glycan site? | Gene names | Molecular Weight |
|---|---|---|---|---|---|---|
| 23 | Protein disulfide-isomerase | Y | Y | Y | CPC735_035440 | 57 kDa |
| 24 | Aha1 domain-containing protein | N | Y | Y | CPSG_01619 | 36 kDa |
| 25 | Flavodoxin domain containing protein | N | Y | N | CPC735_070770 | 22 kDa |
| 26 | NADP-dependent leukotriene B4 12-hydroxydehydrogenase | N | N | N | CPAG_08737 | 38 kDa |
| 27 | Fructose 1,6-bisphosphate aldolase | N | N | N | CPC735_006240 | 40 kDa |

Example 2: Protein Abundances In Vitro and In Vivo

At some abundance level, all 27 (100%) biomarker candidates were expressed in vitro in at least one culture medium and growth phase combination. However, 1 of the biomarker candidates (Uncharacterized protein CIMG_09001) was not present in in vitro grown spherules in any of the 3 media used, and only in two of the mycelial culture media. Likewise, 2 of the biomarker candidates (Cytochrome c oxidase polypeptide VI and Uncharacterized protein CIMG_05576) were not present in any of the in vitro grown mycelial cultures but were present in in vitro grown spherules. With regards to the in vitro growth of spherules, the media that produced the most biomarker candidate proteins $26/27$ (96.3%) was RPMI+Survanta, with Converse+Tamol producing $23/27$ (85.2%) and RPMI+FBS produced $21/27$ (77.8%) of the biomarker candidates. For the mycelial form, the media that produced the most biomarker candidate proteins was RPMI+FBS, which produced $24/27$ (88.9%) of the proteins, whereas Converse+Tamol and RPMI+Survanta only produced $18/27$ (66.7%) of the proteins in the mycelial form.

Figure 4A:
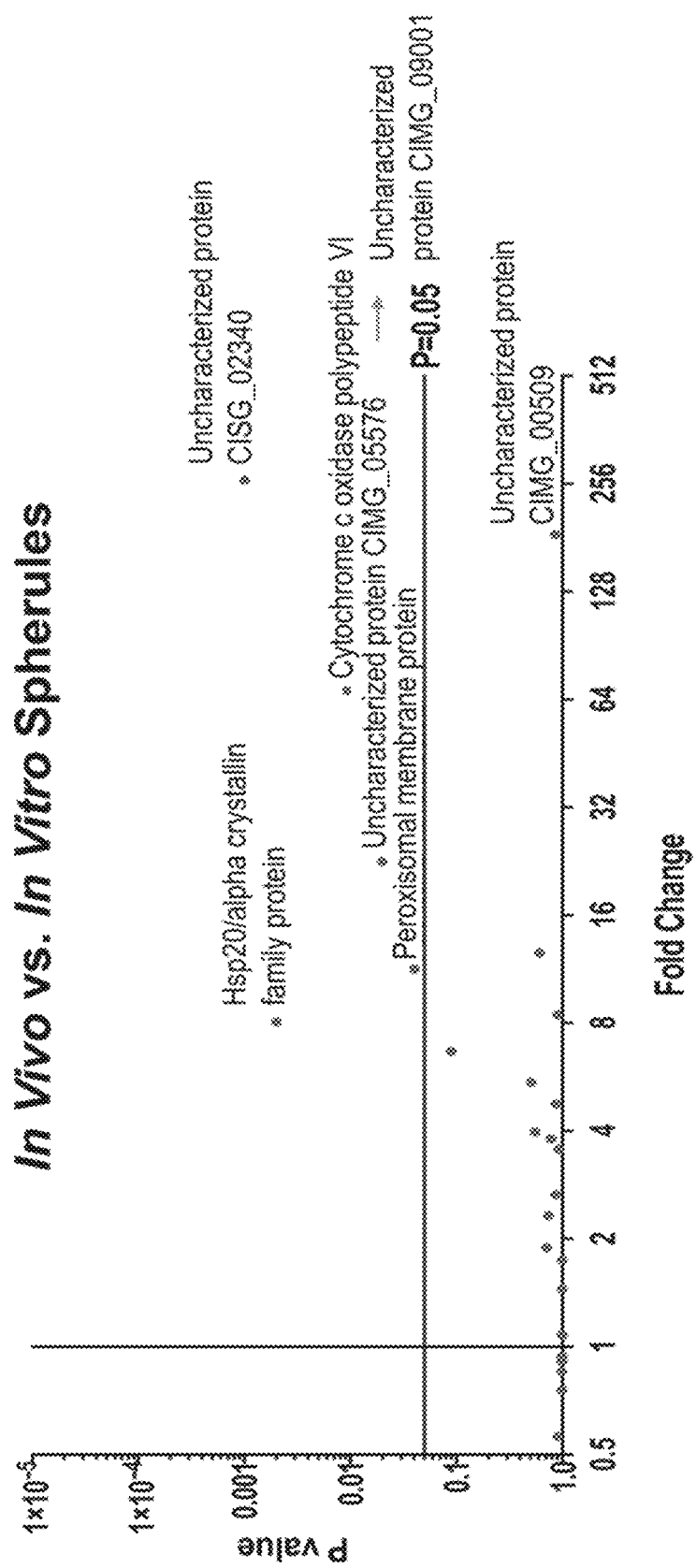

The mean NSAF abundances were used to calculate protein abundance fold changes between in vivo spherules and in vitro grown spherules and mycelia. In FIG. 4A, a volcano plot shows fold change of protein abundance (NSAF) of the 27 proteins from in vivo spherules relative to the protein abundance from in vitro spherules. Six of the 27 biomarker candidate proteins were significantly more abundant in the in vivo spherules than in vitro grown spherules: Hsp20/alpha crystallin family protein, Peroxisomal matrix protein, Cytochrome c oxidase polypeptide VI, Uncharacterized protein CISG_02340, Uncharacterized protein CIMG_09001, and Uncharacterized protein CIMG_05576. The fold change for Uncharacterized protein CIMG_09001 could not be calculated as this protein was not present at all in in vitro spherule cultures; however, the highest calculable fold change was Uncharacterized protein CISG_02340 (~261 fold greater in vivo than in in vitro spherules).

Figure 4B:
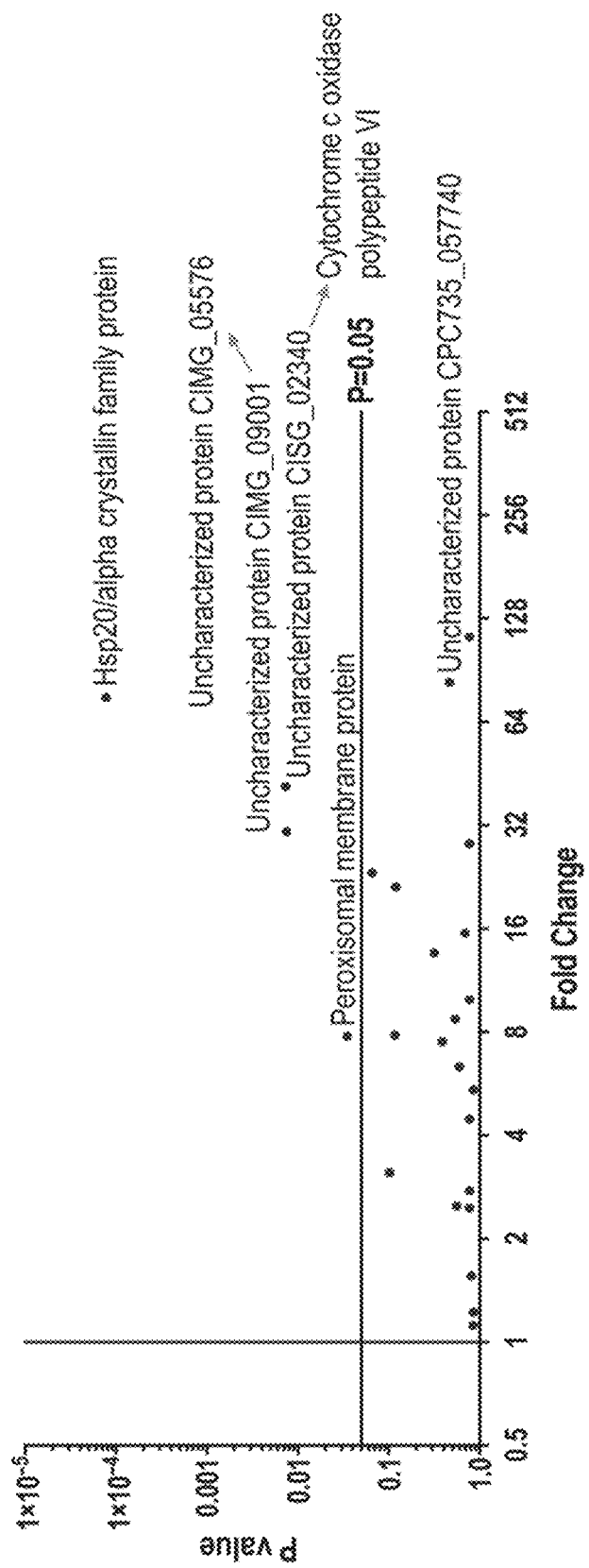
Figure 5A:
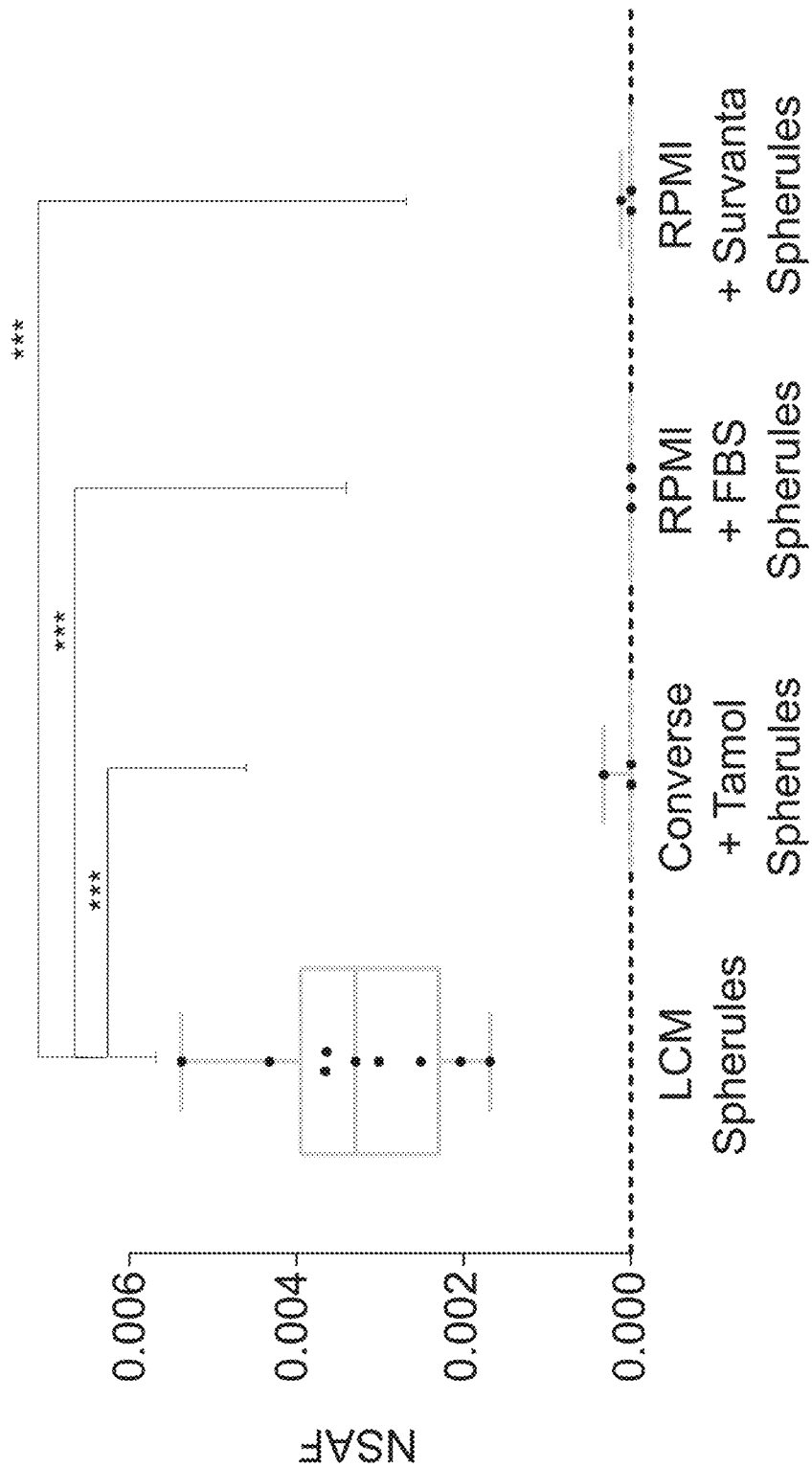
Figure 5B:
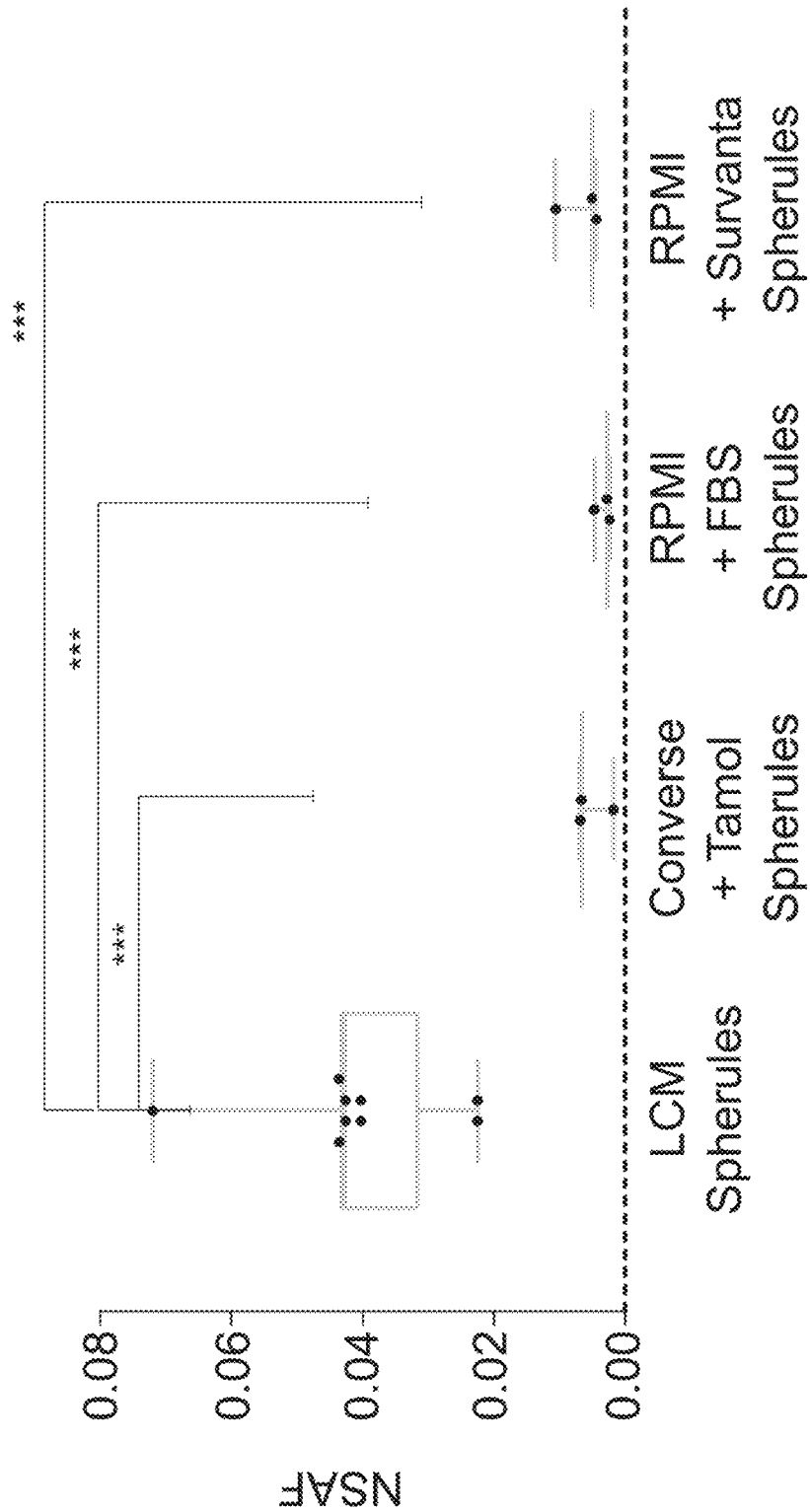
Figure 5C:
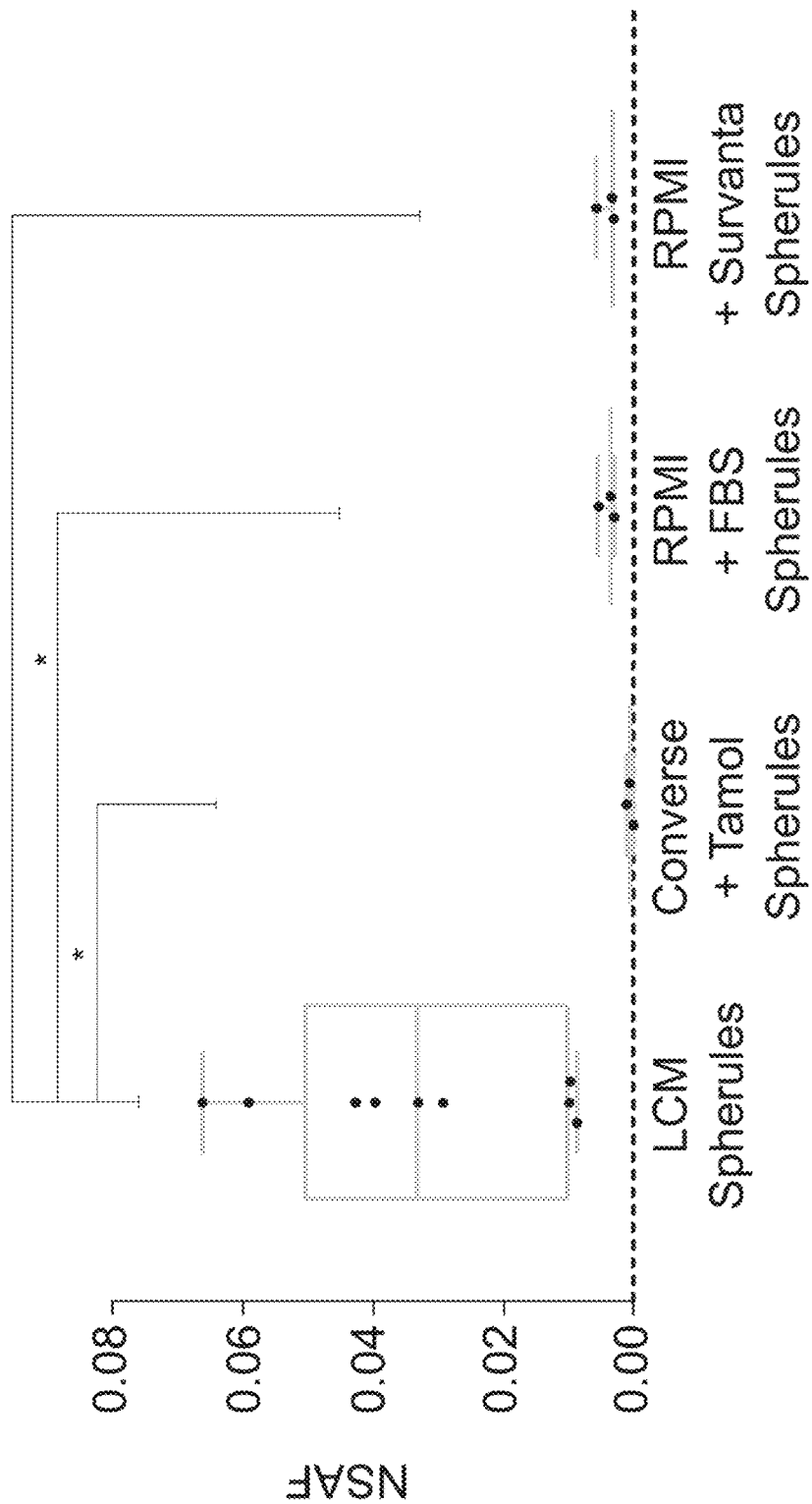
Figure 5D:
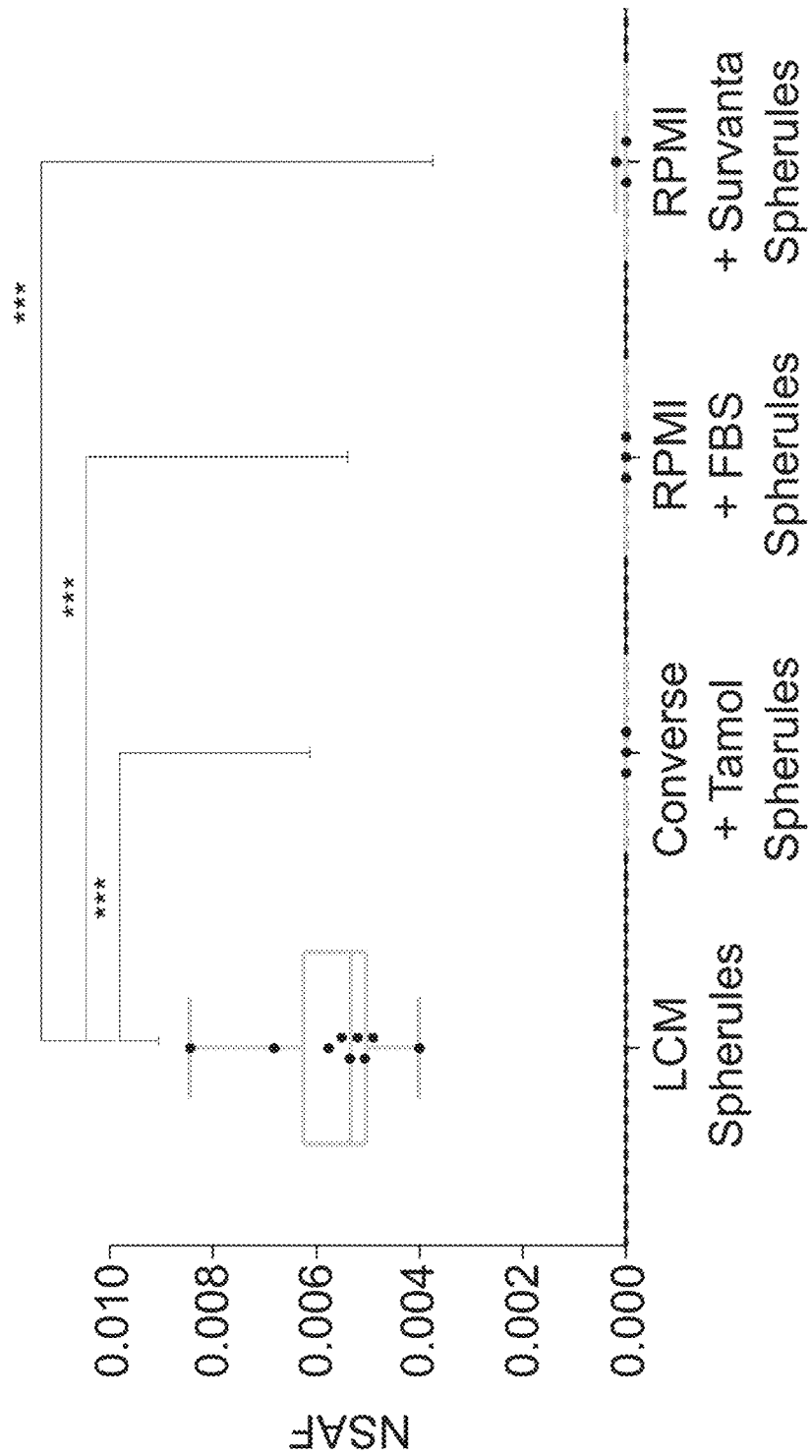
Figure 5E:
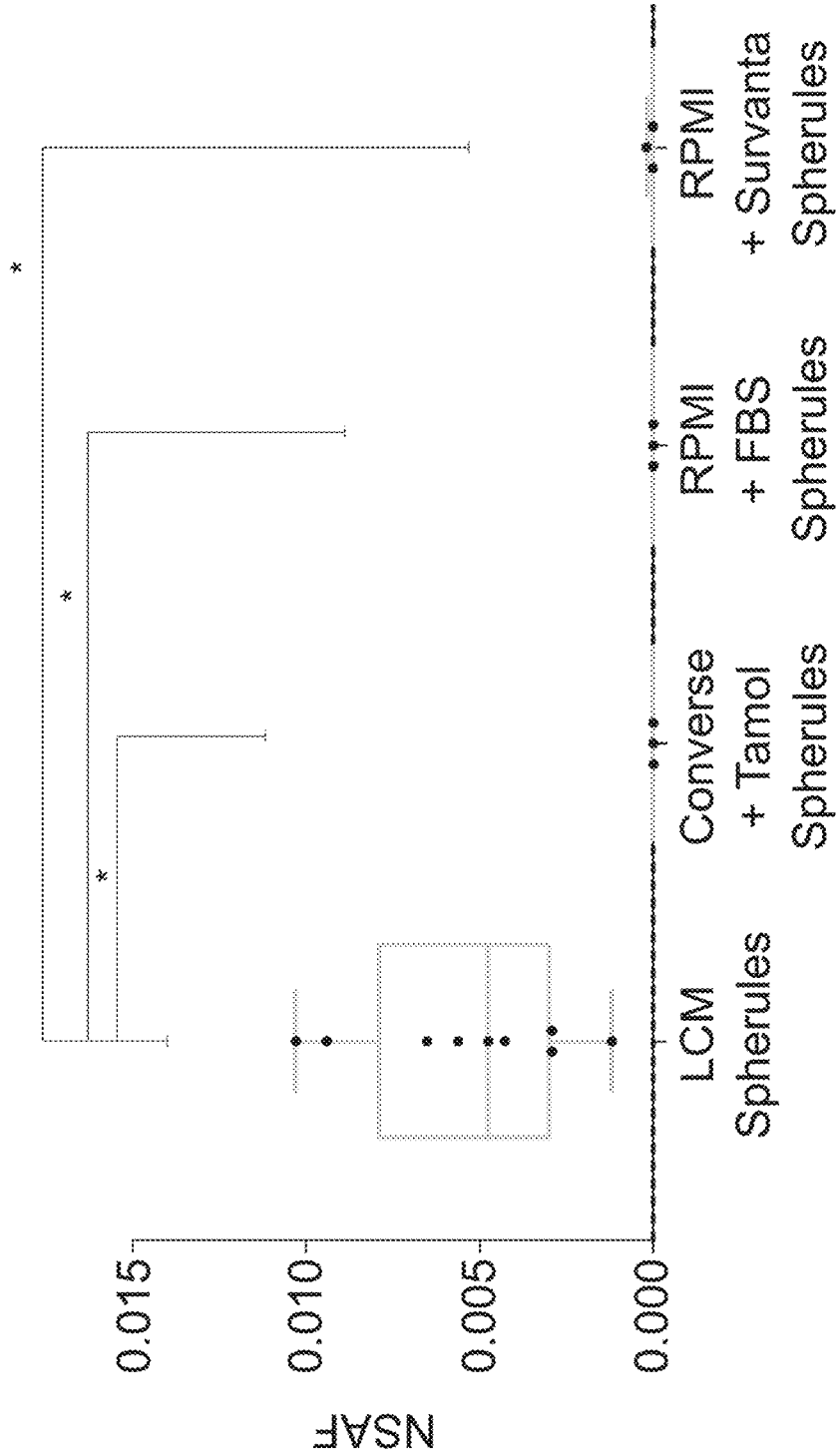
Figure 5F:
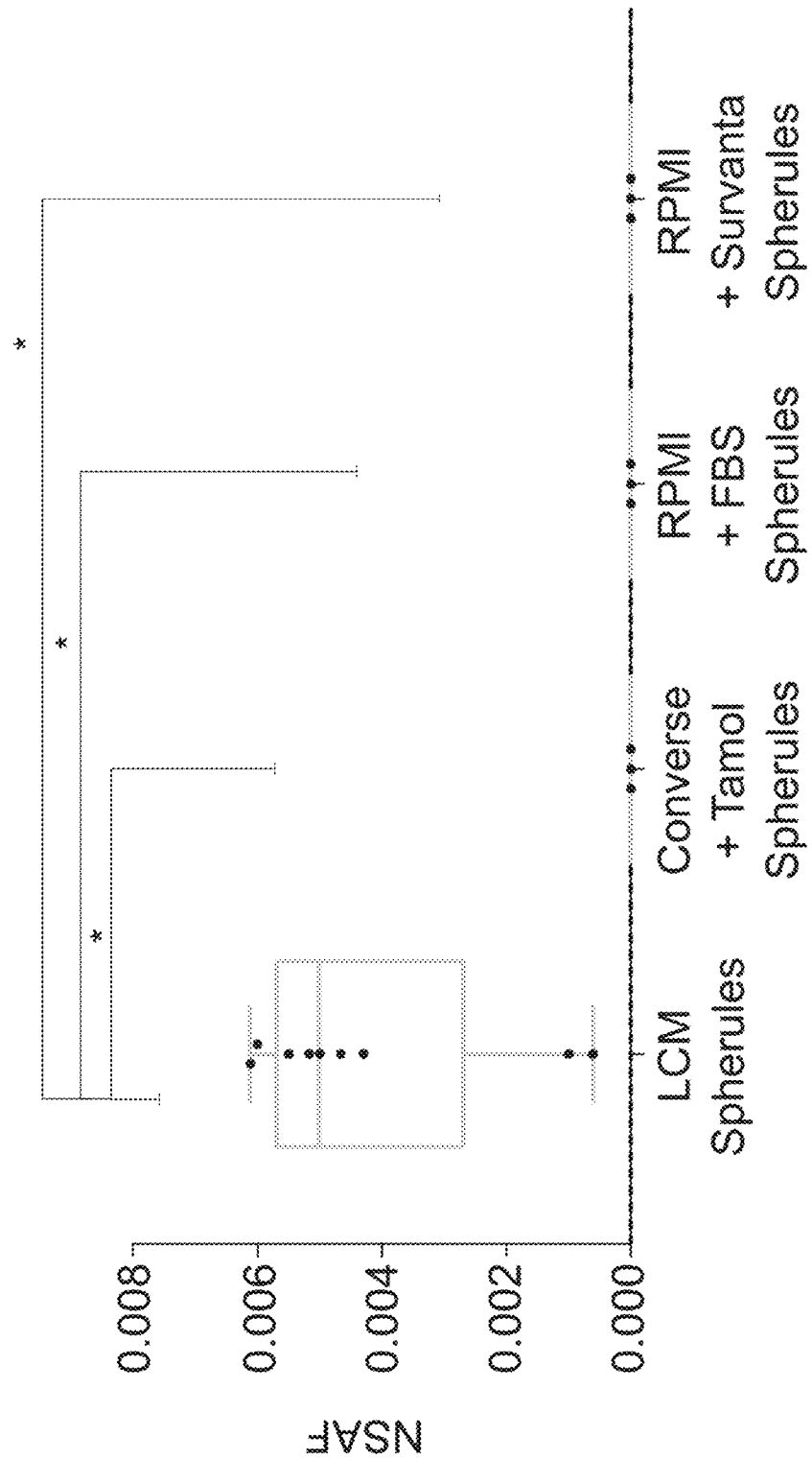

Fold change of relative protein abundances from in vitro grown spherules in relation to in vitro grown mycelia is shown in FIG. 4B. Six proteins were significantly more abundant in the in vitro grown spherules than in vitro grown mycelia: Hsp20/alpha crystallin family protein, Peroxisomal matrix protein, Cytochrome c oxidase polypeptide VI, Uncharacterized protein CISG_02340, Uncharacterized protein CIMG_09001 and Uncharacterized protein CIMG_05576. The protein with the greatest calculable fold change was mitochondrial ATP synthase delta chain (~113 fold greater in spherules), although this difference was not statistically significant.

The most significantly abundant proteins from FIGS. 4A-4B were then evaluated for their ability to be produced in vitro. FIGS. 5A-5F shows the protein abundances of each in vitro media used, as compared to the abundance of the same protein in vivo. All of the 6 most significantly abundant in vivo spherule proteins were able to be produced in spherules in vitro, however abundances were media dependent. For example, CIMG_05576 was more abundant in spherules grown in RPMI+Survanta than it was in other growth conditions, including mycelial cultures, but was still 147-fold lower abundance than it is when spherules grow in human lungs.

Taken together, these results demonstrate that Coccidioidal protein expression in vivo is distinct from Coccidioidal protein expression in vitro amongst its two growth phases in each of 3 different culture media.

Other Embodiments

All of the features disclosed in this specification can be combined in any combination. Each feature disclosed in this specification can be replaced by an alternative feature serving the same, equivalent, or similar purpose. Thus, unless expressly stated otherwise, each feature disclosed is only an example of a generic series of equivalent or similar features.

From the above description, one skilled in the art can easily ascertain the essential characteristics of the present invention, and without departing from the spirit and scope thereof, can make various changes and modifications of the invention to adapt it to various usages and conditions. Thus, other embodiments are also within the claims.

EQUIVALENTS

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments can be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

All references, patents and patent applications disclosed herein are incorporated by reference with respect to the subject matter for which each is cited, which in some cases can encompass the entirety of the document.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

What is claimed is:

1. A method for treating coccidioidomycosis (Valley Fever), the method comprising detecting a level of at least one biomarker in a sample from a subject, and administering a therapy to the subject, wherein the therapy is an antifungal therapy selected from the group consisting of fluconazole, itraconazole, amphotericin B, voriconazole, posaconazole, and isavuconazonium sulfate, and wherein the at least one biomarker is a protein from *Coccidioides* selected from the group consisting of:
SEQ ID NO:2,
SEQ ID NO:3,
SEQ ID NO:4,
SEQ ID NO:5,
SEQ ID NO:6,
SEQ ID NO:7,
SEQ ID NO:8,
SEQ ID NO:9,
SEQ ID NO:10,
SEQ ID NO:11,
SEQ ID NO:12,
SEQ ID NO:13, and
SEQ ID NO: 14.

2. The method of claim 1, wherein the level of at least one biomarker protein is detected by an immunohistochemical assay, an immunoblotting assay, or a flow cytometry assay.

3. The method of claim 1, wherein detecting the level of at least one biomarker comprises detecting a level of at least one biomarker nucleic acid encoding the at least one biomarker protein from *Coccidioides*.

4. The method of claim 3, wherein the level of at least one biomarker nucleic acid is detected by a real-time reverse transcriptase PCR (RT-PCR) assay or a nucleic acid microarray assay.

5. The method of claim 1, wherein the sample comprises plasma, urine, serum, tissue, sputum, bronchoalveolar lavage fluid (BALF), or a combination thereof.

6. The method of claim 1, wherein the sample is obtained from a subject having or suspected of having coccidioidomycosis (Valley Fever).

7. The method of claim 1, wherein the subject is a human patient.

8. A method of identifying and treating a subject having coccidioidomycosis (Valley Fever), the method comprising:
(1) performing laser capture microdissection on the lung tissue sample from a subject to detect a level of at least one biomarker protein in the sample by LC-MS, wherein the at least one biomarker is a protein from *Coccidioides* selected from the group consisting of:
SEQ ID NO:2,
SEQ ID NO:3,
SEQ ID NO:4,
SEQ ID NO:5,
SEQ ID NO:6,
SEQ ID NO:7,
SEQ ID NO:8,
SEQ ID NO:9,
SEQ ID NO:10,
SEQ ID NO:11,
SEQ ID NO:12,
SEQ ID NO:13, and
SEQ ID NO:14;
(2) comparing a level of at least one biomarker in the sample from the subject to a reference level,
(3) identifying the subject having coccidioidomycosis (Valley Fever) with a level of the at least one biomarker in the sample that is above the reference level, and
(4) administering a therapy to the subject having coccidioidomycosis (Valley Fever), wherein the therapy is an antifungal therapy selected from the group consisting of fluconazole, itraconazole, amphotericin B, voriconazole, posaconazole, and isavuconazonium sulfate.

9. The method of claim 8, wherein the sample is obtained from a subject having or suspected of having coccidioidomycosis (Valley Fever).

10. The method of claim 8, wherein the subject is a human patient.

* * * * *

```
                    SEQUENCE LISTING

<160> NUMBER OF SEQ ID NOS: 14

<210> SEQ ID NO 1
<211> LENGTH: 166
<212> TYPE: PRT
<213> ORGANISM: Coccidioides spp
<220> FEATURE:
<221> NAME/KEY: MISC_FEATURE
<223> OTHER INFORMATION: CPC735_024650

<400> SEQUENCE: 1

Met Ala Ser Leu Lys Ala Gly Asp Ser Phe Pro Ser Asp Val Val Phe
1               5                   10                  15

Ser Tyr Ile Pro Trp Thr Pro Asp Asn Lys Asp Ile Lys Ala Cys Gly
            20                  25                  30

Met Pro Gln Asn Tyr Glu Ala Ser Lys Leu Trp Ala Asp Lys Lys Val
        35                  40                  45

Val Leu Phe Ser Leu Pro Gly Ala Phe Thr Pro Thr Cys Ser Ala Ser
    50                  55                  60
```
His Leu Pro Gly Tyr Ile Gln Lys Leu Pro Gln Leu Lys Glu Lys Gly
65 70 75 80

Val Asp Val Val Ala Val Leu Ala Phe Asn Asp Ala Trp Val Met Ser
85 90 95

Ala Trp Gly Lys Ala Asn Gly Val Thr Gly Asp Asp Ile Leu Phe Leu
100 105 110

Ser Asp Pro Glu Ala Lys Phe Ser Lys Ser Ile Gly Trp Asn Ala Gly
115 120 125

Glu Arg Thr Gly Arg Tyr Ala Met Ile Ile Asp His Gly Gln Val Thr
130 135 140

Tyr Ala Glu Ile Glu Pro Gly Arg Glu Val Thr Val Ser Gly Ala Asp
145 150 155 160

Ala Val Ile Ser Lys Leu
165

<210> SEQ ID NO 2
<211> LENGTH: 151
<212> TYPE: PRT
<213> ORGANISM: Coccidioides spp
<220> FEATURE:
<221> NAME/KEY: MISC_FEATURE
<223> OTHER INFORMATION: CISG_03898

<400> SEQUENCE: 2

Met Ser Val Gly Ser Asp Val Ser Ile Asn Pro Asp Cys Ile Ser Ala
1 5 10 15

Phe Asn Glu Leu Arg Leu Gly Arg Gly Lys Thr Lys Phe Ile Ile Phe
20 25 30

Lys Ile Ala Asp Asn Arg Arg Glu Ile Val Val Glu Glu Ala Ser Lys
35 40 45

Glu Pro Asp Tyr Glu Ile Phe Arg Glu Lys Leu Glu Gly Ala Lys Asp
50 55 60

Ser Lys Gly Asn Pro Ala Pro Arg Tyr Ala Val Tyr Asp Val Glu Phe
65 70 75 80

Glu Leu Glu Gly Gly Glu Gly Lys Arg Ser Lys Ile Val Phe Ile Ser
85 90 95

Trp Val Pro Ser Glu Thr Pro Thr Phe Trp Ser Met Leu Tyr Ala Thr
100 105 110

Ser Arg Gln Thr Leu Lys Asn Ala Leu Asn Pro His Thr Ser Ile His
115 120 125

Ala Asp Asp Lys Ala Glu Leu Glu Trp Lys Asn Val Leu Thr Glu Ala
130 135 140

Ser Gly Gly Met Ala Thr Lys
145 150

<210> SEQ ID NO 3
<211> LENGTH: 147
<212> TYPE: PRT
<213> ORGANISM: Coccidioides spp
<220> FEATURE:
<221> NAME/KEY: MISC_FEATURE
<223> OTHER INFORMATION: CPC735_024650

<400> SEQUENCE: 3

Met Ser Ser Ile Ala Ala Asn Val Ala Arg Arg Ala Ile Leu Arg Gln
1 5 10 15

Pro Leu Arg Thr Val Arg Ala Gln Pro Val Arg Arg Tyr Ala Ser Arg
20 25 30

Val Glu Glu Ala Gly Leu Asp Lys Gly Pro Lys Arg Asp Pro Glu Leu
             35                  40                  45

Tyr Leu Leu Gly Val Met Ala Gly Ala Phe Gly Leu Ala Gly Trp
 50                  55                  60

Tyr Phe Gly Arg Ser Pro Thr Thr Val Thr Ser Glu Ser Asn Ile Arg
 65                  70                  75                  80

Ile Gly Glu Ser Ala Met Pro Trp Val Asp Glu Lys Asp Val Glu
                 85                  90                  95

Ala Gln Gly Asn Phe Lys Tyr Gln Tyr His Pro His Gly Asp Lys Asn
                100                 105                 110

Lys Pro Leu Lys Ser Ala Pro Ser Ala Leu Asn Glu Val Val Ile Pro
                115                 120                 125

Asn Val Thr Leu Pro Lys Asp Leu His Asp Arg Phe Asn Lys Tyr Gly
                130                 135                 140

Lys Asp Tyr
145

<210> SEQ ID NO 4
<211> LENGTH: 191
<212> TYPE: PRT
<213> ORGANISM: Coccidioides spp
<220> FEATURE:
<221> NAME/KEY: MISC_FEATURE
<223> OTHER INFORMATION: CPC735_022920

<400> SEQUENCE: 4

Met Ala Ser Thr Gln Val Pro Glu Val Leu Trp Ala Gln Arg Ser Ser
 1               5                  10                  15

Glu Thr Glu Pro Ala Lys Asn Ile Ile Tyr Leu Ser Leu Ala Val Pro
                 20                  25                  30

Asp Val Pro Glu Ser Ser Ala Lys Leu Asp Val Thr Pro Thr Thr Val
                 35                  40                  45

Ser Phe Ser Gly His Ser Ser Thr Lys Asn Ile Asp Tyr Lys Val Asp
 50                  55                  60

Leu Glu Leu Tyr Ala Glu Ile Asp Val Ala Asn Ser Lys Arg His His
 65                  70                  75                  80

Ser Ala Arg Gly Val Asp Leu Val Leu Arg Lys Lys Glu Val Lys Gln
                 85                  90                  95

Glu Phe Trp Pro Arg Leu Leu Lys Glu Ser Lys Lys Val His Phe Val
                100                 105                 110

Lys Thr Asp Phe Asp Lys Trp Val Asp Glu Asp Glu Gln Glu Glu Ala
                115                 120                 125

Lys Glu Asp Asp Phe Ser Asn Met Thr Gly Gly Leu Gly Gly Ile Asp
                130                 135                 140

Phe Ser Lys Leu Gly Gly Gly Asp Leu Ser Glu Leu Glu Gly Asp Val
145                 150                 155                 160

Ala Glu Glu Ala Gln Ser Asp Asp Asp Glu Met Pro Ala Leu Glu
                165                 170                 175

Asp Asp Ala Pro Glu Ser Ser Lys Pro Lys Ile Glu Glu Val Ser
                180                 185                 190

<210> SEQ ID NO 5
<211> LENGTH: 284
<212> TYPE: PRT
<213> ORGANISM: Coccidioides spp
<220> FEATURE:
<221> NAME/KEY: MISC_FEATURE

<223> OTHER INFORMATION: CPC735_002880

<400> SEQUENCE: 5

```
Met Ala Ala Pro Ala Ala Phe Gly Asp Ile Ala Lys Thr Val Asn Asp
1               5                   10                  15

Leu Leu Asn Lys Asp Phe Tyr His Thr Ser Ala Ala Ser Leu Glu Val
            20                  25                  30

Lys Ser Lys Ala Pro Asn Gly Val Thr Phe Asn Val Lys Gly Lys Ser
        35                  40                  45

Ala His Glu Gly Pro Ile Ser Gly Ser Leu Glu Ala Lys Tyr Val Asp
    50                  55                  60

Pro Pro Thr Gly Leu Thr Leu Thr Gln Thr Trp Thr Thr Gly Asn Ala
65                  70                  75                  80

Leu Asp Thr Lys Leu Glu Leu Asp Asn Asn Ile Ala Lys Gly Leu Lys
                85                  90                  95

Ala Glu Val Leu Thr Gln Tyr Leu Pro Tyr Ser Asn Ser Lys Gly Ala
            100                 105                 110

Lys Leu Asn Leu His Phe Lys Gln Pro Asn Leu His Ala Arg Ala Phe
        115                 120                 125

Phe Asp Leu Leu Lys Gly Pro Thr Ala Asn Phe Asp Ala Val Leu Gly
    130                 135                 140

His Glu Gly Phe Leu Val Gly Ala Glu Gly Gly Tyr Asp Val Gln Lys
145                 150                 155                 160

Ala Ala Ile Thr Lys Tyr Ser Ala Ala Val Ala Tyr Ser Leu Pro Glu
                165                 170                 175

Tyr Ser Ala Ala Ile Thr Ala Thr Asn Asn Leu Thr Leu Phe Ser Ala
            180                 185                 190

Ser Tyr Tyr His Arg Val Asn Ser Gln Val Glu Ala Gly Ala Lys Ala
        195                 200                 205

Thr Trp Asp Ser Lys Ala Gly Asn Thr Val Gly Leu Glu Val Ala Ser
    210                 215                 220

Lys Tyr Arg Leu Asp Pro Ser Ser Phe Ala Lys Ala Lys Ile Asn Asp
225                 230                 235                 240

Arg Gly Ile Ala Ala Leu Ala Tyr Asn Val Leu Leu Arg Pro Gly Val
                245                 250                 255

Thr Leu Gly Leu Gly Ala Ser Val Asp Thr Gln Asn Leu Asn Gln Ala
            260                 265                 270

Ala His Lys Val Gly Ala Ser Phe Thr Phe Glu Gly
        275                 280
```

<210> SEQ ID NO 6
<211> LENGTH: 342
<212> TYPE: PRT
<213> ORGANISM: Coccidioides spp
<220> FEATURE:
<221> NAME/KEY: MISC_FEATURE
<223> OTHER INFORMATION: CPC735_026500

<400> SEQUENCE: 6

```
Met Ser Ser Ala Val Asn Glu Leu Ala Asp Thr Met Ala Asn Thr Ser
1               5                   10                  15

Leu Asn Glu Pro Thr Asn Gly Thr Pro Ala Ala Thr Ala Glu Ile Gly
            20                  25                  30

Ala Thr Ala Ala Ser Ala Asp Glu Gly Arg Arg Leu Tyr Ile Gly Asn
        35                  40                  45
```

Leu Ala Tyr Ala Thr Thr Glu Gly Glu Leu Lys Glu Phe Phe Lys Gly
            50                  55                  60

Tyr Asn Val Glu Ser Val Ser Ile Pro Val Asn Pro Arg Thr Asn Arg
 65                  70                  75                  80

Pro Val Gly Tyr Ala Phe Val Asp Leu Ala Thr Ala Gln Glu Ala Gln
                85                  90                  95

Ala Ala Ile Ala Ala Leu Thr Gly Lys Asp Ile Leu Glu Arg Arg Val
            100                 105                 110

Ser Val Gln Ile Ala Arg Lys Pro Glu Pro Ala Glu Gly Lys Ala Glu
            115                 120                 125

Ser Gly Ala Glu Gly Thr Ala Gly Gly Gln Gly Arg Lys Arg Gly Gly
130                 135                 140

Gly Arg Gly Arg Gly Arg Gly Arg Gly Gly Arg Phe Gly Arg
145                 150                 155                 160

Gly Gly Arg Ala Asn Gly Val Lys Ala Glu Ala Thr Gly Glu Ala
                165                 170                 175

Ala Pro Ile Val Glu Val Thr Asn Thr Ala Glu Gly Ala Thr Glu Pro
                180                 185                 190

Ala Glu Ala Gly Ser Glu Gly Lys Asp Ala Ala Ala Lys Pro Gln Gly
            195                 200                 205

Arg Pro Arg Lys Gln Arg Gly Pro Pro Glu Asp Gly Ile Pro Ser Lys
210                 215                 220

Thr Lys Val Met Val Ala Asn Leu Pro Tyr Asp Leu Ser Glu Asp Lys
225                 230                 235                 240

Leu Lys Glu Leu Phe Ala Ala Tyr Glu Pro Val Ser Ala Lys Ile Ala
                245                 250                 255

Leu Arg Pro Ile Pro Arg Phe Met Val Lys Lys Leu Gln Ala Arg Gly
            260                 265                 270

Glu Ala Arg Lys Gly Arg Gly Phe Gly Phe Val Thr Leu Gly Ser Glu
            275                 280                 285

Glu Leu Gln Lys Lys Ala Val Glu Glu Met His Gly Lys Asn Ile Asp
290                 295                 300

Gly Arg Glu Ile Ala Val Lys Val Ala Ile Asp Ser Pro Gly Lys Glu
305                 310                 315                 320

Asp Glu Pro Ala Val Ala Thr Glu Thr Thr Glu Pro Ala Thr Gln Glu
                325                 330                 335

Ala Ala Pro Ala Thr Ala
            340

<210> SEQ ID NO 7
<211> LENGTH: 280
<212> TYPE: PRT
<213> ORGANISM: Coccidioides spp
<220> FEATURE:
<221> NAME/KEY: MISC_FEATURE
<223> OTHER INFORMATION: CISG_09525

<400> SEQUENCE: 7

```
Met Pro Val Gly Phe Leu Val Val Leu Leu Phe Cys Pro Arg Asn Cys
1               5                   10                  15

Ile Ser Ile Ser Thr Val Arg Thr Gly Ile Ser Asp Ser Ile Ala His
            20                  25                  30

Arg Asn Ala Ile Gly Ile Pro Leu Ala Thr Arg Ser Arg Pro Val Gly
        35                  40                  45
```

Ile Ile Pro Ser Pro Cys Cys Pro Ala Leu Ser Arg Arg Ala Leu
 50                  55                  60

Arg Ala Ser Ala Gln Gln Phe Ser Arg Arg Ala Ala Ile Asn Gly Val
 65                  70                  75                  80

Arg Thr Tyr Ala Thr Pro Ala Gln Asp Ser Lys Pro Pro Val Ala Leu
                 85                  90                  95

Phe Gly Val Asp Gly Thr Tyr Ala Asn Ala Leu Tyr Thr Ala Ser Ala
                100                 105                 110

Lys Thr Ser Ser Leu Glu Gln Thr Ser Lys Ala Leu Ala Ser Leu Gly
            115                 120                 125

Glu Val Phe Lys Lys Asp Ala Lys Leu Thr Ser Ile Leu Asn Ala Pro
130                 135                 140

Thr Leu Ser Gln Ala Asp Lys Ala Gln Ile Ile Ala Glu Leu Gln Lys
145                 150                 155                 160

Val Ala Gly Gly Ala Gly Lys Gly Asp Ile Leu Lys Asn Phe Leu Asn
                165                 170                 175

Thr Leu Ala Glu Asn Asn Arg Leu Gly Leu Leu Gln Gly Val Cys Glu
            180                 185                 190

Lys Phe Ala Thr Leu Met Gly Ala Tyr Arg Gly Glu Ile Glu Leu Ile
        195                 200                 205

Ile Thr Ser Ala Gln Lys Leu Asp Gln Lys Thr Leu Gln Arg Leu Glu
210                 215                 220

Asn Ala Val Ala Lys Ser Glu Tyr Ser Gln Gly Lys Lys Leu Lys Val
225                 230                 235                 240

Val Thr Lys Ile Asn Ser Asp Val Val Gly Gly Leu Ile Val Glu Ile
                245                 250                 255

Gly Asp Arg Thr Ile Asp Leu Ser Val Ser Ser Lys Met Ala Lys Leu
            260                 265                 270

Asn Lys Ala Leu Thr Asp Ala Leu
        275                 280

<210> SEQ ID NO 8
<211> LENGTH: 164
<212> TYPE: PRT
<213> ORGANISM: Coccidioides spp
<220> FEATURE:
<221> NAME/KEY: MISC_FEATURE
<223> OTHER INFORMATION: CPSG_00594

<400> SEQUENCE: 8

```
Met Ser Pro Ser Thr Leu Ile Arg Ile Ala Ser Arg Arg Thr Pro Ala
1               5                   10                  15

Thr Phe Phe Lys Ala Ser Tyr Ser Ala Arg Ser Arg Leu Pro Ala Ala
            20                  25                  30

Ala Ser Ala Ser Val Pro Ala Ile Val Thr Leu Gly Gly Ala Ser Gly
        35                  40                  45

Phe Ser Thr Thr Ala Lys Arg Cys Ser Gly Ala His Glu Glu Glu Thr
    50                  55                  60

Phe Glu Glu Phe Ser Ala Arg Tyr Glu Lys Glu Phe Asp Ser Val Gln
65                  70                  75                  80

Asp Val Phe Glu Leu Gln Arg Asn Leu Asn Asn Ala Phe Ala Tyr Asp
                85                  90                  95

Leu Val Pro Ser Val Gly Val Met Thr Ala Ala Leu Lys Ala Ala Arg
            100                 105                 110
```

```
Arg Val Asn Asp Phe Pro Thr Ala Val Arg Ile Phe Glu Gly Ile Lys
        115                 120                 125

Ala Lys Val Glu Asn Lys Ser Gln Tyr Glu Ala Tyr Leu Glu Glu Leu
    130                 135                 140

Lys Pro Leu Arg Glu Glu Leu Gly Val Val Leu Gln Glu Glu Met Tyr
145                 150                 155                 160

Pro Ala Glu Lys

<210> SEQ ID NO 9
<211> LENGTH: 314
<212> TYPE: PRT
<213> ORGANISM: Coccidioides spp
<220> FEATURE:
<221> NAME/KEY: MISC_FEATURE
<223> OTHER INFORMATION: CPSG_04876

<400> SEQUENCE: 9

Met Val Pro Arg Val Pro Gln Pro Gly Val Trp Cys Pro Ala Val Thr
1               5                   10                  15

Phe Phe Asp Pro Lys Thr Asp Thr Leu Asp Leu Ala Ser Gln Glu Arg
            20                  25                  30

Tyr Tyr Ala Tyr Leu Ala Arg Ser Gly Leu Thr Gly Leu Val Ile Leu
        35                  40                  45

Gly Thr Asn Ala Glu Ala Phe Leu Leu Thr Arg Glu Glu Arg Ala Gln
    50                  55                  60

Leu Ile Ala Thr Ala Arg Lys Ala Val Gly Pro Asp Phe Pro Ile Met
65                  70                  75                  80

Ala Gly Val Gly Ala His Ser Thr Arg Gln Val Leu Glu His Ile Asn
                85                  90                  95

Asp Ala Ser Thr Ala Gly Ala Asn Tyr Val Leu Val Leu Pro Pro Ala
            100                 105                 110

Tyr Phe Gly Lys Ala Thr Thr Pro Pro Val Ile Lys Ser Phe Phe Asp
        115                 120                 125

Asp Val Ser Cys Gln Ser Pro Leu Pro Val Val Ile Tyr Asn Phe Pro
    130                 135                 140

Gly Val Cys Asn Gly Ile Asp Leu Asp Ser Asp Met Ile Thr Thr Ile
145                 150                 155                 160

Ala Arg Lys Asn Pro Asn Val Val Gly Val Lys Leu Thr Cys Ala Ser
                165                 170                 175

Val Gly Lys Ile Thr Arg Leu Ala Ala Thr Leu Pro Pro Ala Glu Phe
            180                 185                 190

Ser Val Phe Gly Gly Gln Ser Asp Phe Leu Ile Gly Gly Leu Ser Val
        195                 200                 205

Gly Ser Ala Gly Cys Ile Ala Ala Phe Ala Asn Val Phe Pro Lys Thr
    210                 215                 220

Val Ser Lys Ile Tyr Glu Leu Tyr Lys Ala Gly Lys Val Asp Gln Ala
225                 230                 235                 240

Met Glu Leu His Arg Lys Ala Ala Leu Ala Glu Ser Pro Cys Lys Ser
                245                 250                 255

Gly Ile Ala Thr Thr Lys Tyr Ala Ala Ala Ile Phe Ser Ala Lys Ala
            260                 265                 270

Ala Gly Ile Glu Asp Ala Glu Glu Lys Leu Arg Pro Arg Lys Pro Tyr
        275                 280                 285

Asp Pro Pro Ser Glu Ala Ala Lys Gln Glu Val Arg Lys Val Met Ala
    290                 295                 300
```

```
Glu Val Ala Ala Ile Glu Ala Gly Leu Ser
305                 310

<210> SEQ ID NO 10
<211> LENGTH: 165
<212> TYPE: PRT
<213> ORGANISM: Coccidioides spp
<220> FEATURE:
<221> NAME/KEY: MISC_FEATURE
<223> OTHER INFORMATION: CPC735_070430

<400> SEQUENCE: 10

Met Phe Thr Ala Arg Phe Ala Arg Ser Ala Leu Arg Ala Arg Pro Ala
1               5                   10                  15

Ala Phe Arg Leu Pro Ile Gln Gln Arg Thr Tyr Ala Gln Ala Val Ser
            20                  25                  30

Asp Lys Leu Arg Leu Ser Leu Val Leu Pro His Glu Thr Ile Tyr Lys
        35                  40                  45

Ser Ala Asp Val Val Gln Val Asn Ile Ala Ala Glu Ser Gly Asp Met
    50                  55                  60

Gly Ile Leu Ser Ser His Val Pro Ser Ile Glu Gln Leu Arg Pro Gly
65                  70                  75                  80

Leu Ile Glu Ile Ile Glu Glu Ser Gly Gln Thr Lys Lys Phe Phe Leu
                85                  90                  95

Ala Gly Gly Phe Ala Val Val Gln Pro Asp Ser Asn Leu Ser Ile Asn
            100                 105                 110

Ala Val Glu Gly Phe Ala Leu Glu Asp Phe Ser Ala Asp Ala Val Lys
        115                 120                 125

Ser Gln Ile Gly Glu Ala Gln Arg Ile Ala Ala Gly Ser Gly Ser Glu
    130                 135                 140

Gln Asp Ile Ala Glu Ala Lys Val Glu Leu Glu Val Leu Glu Ser Leu
145                 150                 155                 160

Gln Ala Ala Met Lys
                165

<210> SEQ ID NO 11
<211> LENGTH: 174
<212> TYPE: PRT
<213> ORGANISM: Coccidioides spp
<220> FEATURE:
<221> NAME/KEY: MISC_FEATURE
<223> OTHER INFORMATION: CPC735_012590

<400> SEQUENCE: 11

Met Ala Val Ala Arg Ser Ala Ala Leu Lys Leu Asp Trp Thr Lys Val
1               5                   10                  15

Ala Ser Ser Leu Gly Leu Arg Gly Gly Thr Ala Thr Ser Leu Gln Ala
            20                  25                  30

Phe Lys Lys Arg Asn Asp Asp Ala Arg Arg Lys Val Gln Thr Leu Ser
        35                  40                  45

Glu Ala Pro Gln Thr Ile Asp Phe Glu His Tyr Arg Ser Val Leu Lys
    50                  55                  60

Asn Lys Ala Ile Val Asp Glu Ile Glu Lys Gln Phe Lys Ala Phe Lys
65                  70                  75                  80

Pro Gln Thr Tyr Asp Val Asn Arg Gln Leu Lys Ala Ile Glu Ala Phe
                85                  90                  95

Glu Ala Gln Ala Val Thr Ser Ala Glu Ala Thr Lys Gly Lys Val Glu
            100                 105                 110
```
Glu Glu Leu Lys Tyr Leu Glu Lys Thr Leu Glu Asn Ile Glu Thr Ala
115 120 125

Arg Pro Trp Glu Asp Leu Thr Val Asp Asp Val Val Thr Ala Gln Pro
130 135 140

Glu Ile Glu Lys Lys Thr Ala Glu Leu Val Lys Arg Gly Ile Trp Met
145 150 155 160

Pro Pro Gly Tyr Lys Glu Lys Tyr Gly Asp Leu Ser Phe Leu
165 170

<210> SEQ ID NO 12
<211> LENGTH: 327
<212> TYPE: PRT
<213> ORGANISM: Coccidioides spp
<220> FEATURE:
<221> NAME/KEY: MISC_FEATURE
<223> OTHER INFORMATION: CPSG_01619

<400> SEQUENCE: 12

Met Val Leu His Asn Pro Asn Asn Trp His Trp Val Asn Lys Asp Val
1 5 10 15

Ser Ala Trp Val Lys Asp Tyr Leu Gly Glu Lys Leu Ala Ala Ile Ser
20 25 30

Ala Glu Glu Asn Gly Val Thr Ala Lys Val Ser Lys Ile Val Ser Met
35 40 45

Asp Gly Asp Val Asp Val Ser Gln Arg Lys Gly Lys Val Ile Thr Leu
50 55 60

Phe Asp Val Lys Leu Thr Leu Glu Phe Glu Gly Thr Thr Asp Glu Asp
65 70 75 80

Asp Ser Val Ser Gly Ser Ile Lys Val Pro Glu Val Ala His Asp Thr
85 90 95

Glu Glu Asp Glu Tyr Val Phe Asp Ile Ser Leu Tyr Ser Glu Ser Ala
100 105 110

Ser Lys Gln Pro Val Lys Asp Leu Val Arg Ser Lys Ile Val Pro Gln
115 120 125

Leu Arg Thr Glu Leu Ala Lys Leu Ala Pro Ala Leu Ile Ala Glu His
130 135 140

Gly Lys Asp Ile Gln His Ala Pro Gly Ser Asn Pro Ser Ser Gly Phe
145 150 155 160

Ala Thr Pro Lys Tyr Leu Ser Ser Asp Val Gln Ser Ser Ser Lys Pro
165 170 175

Ala Thr Gln Thr Thr Thr Thr Thr Thr Arg Lys Gln Ala Val Asn Thr
180 185 190

Val Thr Val Asn Ala Ser Asp Glu Phe Arg Thr Thr Ala Glu Glu Met
195 200 205

Tyr Thr Thr Phe Thr Asp Pro Gln Arg Leu Ala Val Phe Thr Arg Ala
210 215 220

Pro Pro Arg Arg Phe Asp Gly Ala Gln Val Gly Gly Lys Phe Ser Ile
225 230 235 240

Phe Asp Gly Asn Val Thr Gly Glu Phe Val Lys Leu Glu Gln Pro Thr
245 250 255

Leu Ile Val Gln Lys Trp Arg Leu Ala Gln Trp Pro Glu Asp His Tyr
260 265 270

Ser Thr Leu Glu Ile Arg Phe Asp Gln Asn Asp Val Asp Cys Val Thr
275 280 285

```
Thr Leu His Val Lys Trp Asp Gly Val Pro Val Gly Gln Glu Asp Val
    290                 295                 300
Val Gln Arg Asn Trp Asp Val Tyr Tyr Val Arg Ser Ile Lys Gln Ala
305                 310                 315                 320
Phe Gly Phe Gly Thr Ile Leu
                325

<210> SEQ ID NO 13
<211> LENGTH: 203
<212> TYPE: PRT
<213> ORGANISM: Coccidioides spp
<220> FEATURE:
<221> NAME/KEY: MISC_FEATURE
<223> OTHER INFORMATION: CPC735_070770

<400> SEQUENCE: 13

Met Ala Pro Lys Ile Ala Ile Val Phe Tyr Ser Met Tyr Gly His Ile
1               5                   10                  15

Leu Lys Leu Ala Glu Ala Glu Lys Arg Gly Ile Glu Ala Ala Gly Gly
            20                  25                  30

Thr Ala Asp Leu Tyr Gln Ile Glu Glu Thr Leu Ser Asp Glu Val Leu
        35                  40                  45

Ala Lys Met His Ala Pro Ala Lys Ser Asn His Pro Ile Ala Ala Pro
    50                  55                  60

Glu Asp Leu Leu Lys Tyr Asp Ala Ile Leu Phe Gly Ile Pro Thr Arg
65                  70                  75                  80

Tyr Gly Asn Phe Pro Ala Gln Trp Lys Ala Phe Trp Asp Lys Thr Gly
                85                  90                  95

Ser Ile Trp Ala Lys Gly Gly Phe Trp Gly Lys Tyr Val Gly Thr Phe
            100                 105                 110

Val Ser Thr Gly Thr Pro Gly Gly Gly Gln Glu Ser Thr Val Ile Ala
        115                 120                 125

Ala Met Ser Thr Phe Val His His Gly Met Ile Phe Val Pro Leu Gly
    130                 135                 140

Tyr Lys Thr Ala Phe Pro Ile Leu Ser Asn Leu Ser Glu Ala Arg Gly
145                 150                 155                 160

Gly Ser Pro Trp Gly Ala Gly Thr Phe Ala Ala Gly Asp Gly Ser Arg
                165                 170                 175

Asn Pro Ser Ser Met Glu Ile Glu Leu Ala Glu Ile Gln Gly Lys Ala
            180                 185                 190

Phe Tyr Asp Ala Val Ala Lys Val Arg Phe Ala
        195                 200

<210> SEQ ID NO 14
<211> LENGTH: 348
<212> TYPE: PRT
<213> ORGANISM: Coccidioides spp
<220> FEATURE:
<221> NAME/KEY: MISC_FEATURE
<223> OTHER INFORMATION: CPAG_08737

<400> SEQUENCE: 14

Met Ala Thr Glu Asn Lys Ala Leu Phe Tyr Gln Lys Val Pro Thr Glu
1               5                   10                  15

Phe Pro Val Pro Gly Glu His Leu Thr Ile Glu Lys Val Pro Phe Asp
            20                  25                  30

Pro Glu Ala Pro Ala Pro Asp Gly Gly Leu Thr Leu Gln Thr Leu Tyr
        35                  40                  45
```

```
Thr Ser Phe Asp Pro Tyr Met Arg Gly Gly Met Arg Pro Ala Gln Val
    50                  55                  60
Lys Ser Tyr Arg Pro Ala Tyr Glu Ile Gly Lys Pro Leu Pro Ser Ile
65                  70                  75                  80
Ser Ile Val Lys Val Leu Lys Ser Asn Asn Asp Arg Phe Lys Pro Gly
                85                  90                  95
Asp Ile Ala Ile Gly Phe Met Pro Ile Gln Gln Tyr Ile Ala Ala Pro
                100                 105                 110
Ala Glu Thr Val Gln Ala Leu Arg Leu Leu Asp Asn Pro Leu Gly Leu
            115                 120                 125
Asp Asp Leu Arg Tyr Phe Leu Gly Ala Leu Gly Met Pro Gly Leu Thr
            130                 135                 140
Ala Tyr Ser Ser Leu Met Glu Ile Gly Arg Pro Lys Lys Gly Glu Thr
145                 150                 155                 160
Ile Phe Ile Ser Ser Ala Ala Gly Ala Val Gly Gln Val Val Gly Gln
                165                 170                 175
Ile Ala Lys His Glu Gly Leu Arg Val Val Gly Ser Val Gly Ser Asp
                180                 185                 190
Glu Lys Leu Asn Tyr Ile Ile Asn Asp Leu Gly Phe Asp Ala Gly Phe
            195                 200                 205
Asn Tyr Lys Lys Glu Lys Pro Arg Asp Ala Leu Gln Arg Leu Ile Pro
    210                 215                 220
Glu Gly Ile Asp Ile Tyr Tyr Glu Asn Val Gly Gly Glu His Leu Asp
225                 230                 235                 240
Ala Ala Ile Glu Ser Met Asn Asp Phe Gly Arg Ile Val Thr Cys Gly
                245                 250                 255
Met Ile Ser Gln Tyr Asn Val Lys Pro Glu Asp Arg Tyr Pro Ile Lys
            260                 265                 270
Asn Leu Phe Met Val Val Thr Lys Arg Ile Thr Met Arg Gly Phe Ile
            275                 280                 285
Val Ser Asp Pro Gly Met Gly Asp Lys Trp Ala Lys Glu His Arg Glu
    290                 295                 300
Arg Val Ser Gln Trp Ile Lys Asp Gly Thr Phe Lys Pro Met Ile His
305                 310                 315                 320
Glu Thr Val Gly Ile Asp Asn Ala Ala Glu Gly Leu Val Gly Leu Phe
                325                 330                 335
Gln Gly Lys Asn Phe Gly Lys Ala Val Leu Lys Leu
            340                 345
```